United States Patent
Walter et al.

(10) Patent No.: US 9,417,977 B2
(45) Date of Patent: Aug. 16, 2016

(54) DISTRIBUTED TRANSACTIONAL RECOVERY SYSTEM AND METHOD

(75) Inventors: Thomas H. Walter, Althengstett (DE); Ralf Kuersch, Sandhausen (DE); Nikolai D. Tankov, Sofia (BG); Peter H. Peshev, Sofia (BG)

(73) Assignee: SAP SE, Walldorf (DE)

( * ) Notice: Subject to any disclaimer, the term of this patent is extended or adjusted under 35 U.S.C. 154(b) by 916 days.

(21) Appl. No.: 12/347,545

(22) Filed: Dec. 31, 2008

(65) Prior Publication Data

US 2010/0169284 A1    Jul. 1, 2010

(51) Int. Cl.
G06F 17/30    (2006.01)
G06F 11/20    (2006.01)
G06F 11/14    (2006.01)

(52) U.S. Cl.
CPC ........ *G06F 11/2033* (2013.01); *G06F 11/1474* (2013.01); *G06F 11/2025* (2013.01); *G06F 11/2035* (2013.01)

(58) Field of Classification Search
CPC .................... G06F 17/30575; G06F 17/30374
USPC ......................................................... 707/674
See application file for complete search history.

(56) References Cited

U.S. PATENT DOCUMENTS

| | | | |
|---|---|---|---|
| 7,831,782 B1 * | 11/2010 | Coulter et al. ................ | 711/159 |
| 2003/0018927 A1 | 1/2003 | Gadir et al. | |
| 2004/0015668 A1 * | 1/2004 | McBrearty ............. | H04L 63/10 |
| | | | 711/163 |
| 2005/0138081 A1 * | 6/2005 | Alshab et al. ................. | 707/200 |
| 2006/0080569 A1 | 4/2006 | Sciacca | |
| 2006/0101081 A1 * | 5/2006 | Lin et al. ....................... | 707/200 |

FOREIGN PATENT DOCUMENTS

WO    WO 03/073281 A1    9/2003

OTHER PUBLICATIONS

K. Shoens, I. Narang, R. Obermarck, J. Palmer, S. Silen, I. Traiger, and Kent Treiber, "The Amoeba Project," Technology Leverage: Competive Necessity. San Francisco, CA, Feb. 25-28, 1958. Digest of Papers from Compcon; [Computer Society International Conference], Los Alamitos, Comp-Soc. Press, US, vol. 13, Feb. 25, 1985, pp. 102-105, XP000744214.

Pawel Jurczyk and Li Xiong, "Adapting Commit Protocols for Large-Scale and Dynamic Distributed Applications," On the Move to Meaningful Internet Systems: OTM 2008; [Lecture Notes in Computer Science], Springer Berlin Heidelberg, Berlin, Heidelberg, vol. 5331, Nov. 9, 2008, pp. 465-474, XP019109519.

(Continued)

*Primary Examiner* — Fred I Ehichioya
*Assistant Examiner* — Johnese Johnson
(74) *Attorney, Agent, or Firm* — Fountainhead Law Group PC

(57) ABSTRACT

In one embodiment the present invention includes a system for transaction recovery in a distributed computing environment. The system includes a transaction log server, application servers, and resource servers. The transaction log server stores a shared transaction log. The application servers implement a distributed transaction application and accesses the shared transaction log when performing a transaction using the distributed transaction application. The resource servers store data and that operate with the application servers to access the data according to the transaction. If one of the application servers fails, another application server assumes responsibility for a portion of the shared transaction log that was previously accessed by the failed application server.

19 Claims, 8 Drawing Sheets

(56) References Cited

OTHER PUBLICATIONS

Mark Little et al., "Java Transaction Processing," (Prentice Hall PTR 2004), Chapter 2 "Foundation of Transactions in J2EE: The Java Transactioin API", subchapter "Architectural Considerations."—"Failure-Recovery", Feb. 4, 2008, pp. 86-87.

Sun Microsystems, Inc., "Java Transaction API (JTA)," Nov. 1, 2002, Version 1.1.

G. Weikum and G. Vossum, "Transaction Information Systems," Chapter 19, Distributed Transaction Recovery. Academic Press 2002.

European Search Report (from a corresponding foreign application), EP 09007159.8, mailed Oct. 5, 2009.

The Open Group, Technical Standard, Distributed Transaction Processing: The XA Specification, Dec. 1991.

Sun Microsystems, Inc. "J2EE(TM) Connector Architecture Specification," Version 1.5, Final Release Nov. 2003.

European Office Action mailed Sep. 11, 2014 from corresponding foreign application No. EP 09007159.8; 9 pages.

* cited by examiner

DISTRIBUTED TRANSACTIONAL RECOVERY SYSTEM AND METHOD

CROSS REFERENCE TO RELATED APPLICATIONS

Not Applicable.

BACKGROUND

The present invention relates to transactional recoverability, and in particular, to transactional recoverability in a distributed computing environment.

Unless otherwise indicated herein, the approaches described in this section are not prior art to the claims in this application and are not admitted to be prior art by inclusion in this section.

Within many business enterprises today, enterprise applications are leveraging multiple distributed resources which exist within or outside of the enterprise. These resources can be databases, messaging systems, or even applications offering services to the outer world.

In many scenarios it is desirable that updates across such systems are done in a transactional fashion. This basically means the updates have to comply to the ACID criteria (atomicity, consistency, isolation and durability). Atomicity means that changes in the distributed resources are performed at all resources or at none. Consistency means that when the transaction ends, the integrity constraints between these resources must be valid. Isolation means that no operation outside of the transaction should see an intermediate state. Durability means that if the transaction is successfully finished, it will persist and not be undone.

These criteria are today met by nearly all resources which are common within enterprises. A database management system (DBMS) which is asked to withdraw money from one account and to deposit it into another one in a single transaction can be expected to do this flawlessly according to the ACID rules outlined above. The DBMS itself is in full control of the transaction—it is as well the transaction manager and the resource being managed by the transaction manager.

The situation changes fundamentally if a transaction has to span multiple resources. The application server becomes the transaction manager and all resources becomes subordinates of this transaction manager. Because the overall state of the transaction is now distributed over all involved resource managers there will be some amount of time during which the overall transaction is inconsistent.

This inconsistency is not something which can be avoided—it lies in the very nature of distributed systems. So if the system performing the transactional work or parts of it crash the inconsistency will endure. An example of such a situation could be that the application server crashing after one resource has done its changes but the second one has not.

To overcome these issues, transaction recovery strategies may be used. If the systems involved in the transaction become available again, a transaction recovery functionality within the application server remembers what was promised to the application triggering the transaction. The application server checks with the resources about the outcome of their part of the transaction and tries to achieve a consistent state. If the application server is unable to achieve a consistent state it informs the operator about this inconsistency between the involved resources—so at least the problem is identified.

Without transaction recoverability functionality, customer data most likely will become corrupt if distributed transactions are used. That is the situation as it is with the current architecture of the Java™ application server. As described in the book Java Transaction Processing: "Some application servers (today this applies mostly to experimental or Open Source projects rather than enterprise-quality servers) do not provide recovery capabilities and should not be used for applications that interact with multiple recoverable resources that require transactions." See Mark Little et al., Java Transaction Processing (Prentice Hall PTR 2004).

Implementing transaction recovery is a fundamental change for an application server. New recovery functions may be created and used. In addition, the way resources are implemented may be changed. This may require further modifications to other systems, such as the Java™ Messaging System provider within the server, the Transaction Manager, the JDBC (Java™ Database Connectivity) DB (database) Pool Service, and the Java Connector Container.

If an application server and together with it the transaction manager (which was a part of the application server) both crash, the resources which were involved in the transaction are left alone. This loneliness of resources is risky as there is still a transaction pending: After some time the resource will make a decision to commit or to roll back the part of the transaction it was involved in. This decision might be according to the original intent of the Transaction Manager or not—it is a so called heuristic decision. So whenever possible heuristic decisions must be avoided.

A distributed computing environment generally includes a number of tiers, with each tier having one or more computing devices. For example, a two-tier architecture may include a client tier and a server tier, with multiple client devices and multiple server devices in each tier. A three-tier architecture may include a client tier, an application server tier, and a database server tier (again with multiple computing devices in each tier).

The application server tier may also be referred to as an application server cluster. An application server cluster may consist of many server nodes which can perform transactions across distributed resources. The application servers may implement a computing environment such as Java™ Enterprise Edition, Microsoft .NET™ environment, etc.

The database server tier may also be referred to as a resource tier. An application which lives on an application server can use different resources (of the resource tier) in a transactional manner. Examples of resources are database systems, messaging systems, and enterprise information systems.

The part of the application server which controls transactions is called Transaction Manager (TM). The semantics the TM uses to orchestrate transactions across these distributed resources may be described by the DTP (Distributed Transaction Processing) XA Specification from the Open Group.

The TM manages transactions on behalf of the application living on the server. This means it is responsible for keeping all resources in a consistent state. Because the overall state of the transaction is distributed across all involved resource managers there will be some amount of time during which the overall transaction is inconsistent.

This inconsistency is not something which can be avoided—it lies in the very nature of distributed systems. So if the system performing the transactional work (or parts of it) crash, the inconsistency will endure. An example of such a situation could be that the application server node crashes after one resource has done its changes but the second resource has not. If one or more of the application server nodes crashes, the distributed transactions may remain in an incomplete state.

As every participant of such a transaction can crash it is necessary that each participant writes it decision to commit or rollback to a persistent store. This store is called the Transaction Log (TLOG).

Transaction processing may be done according to the DTP XA Specification of the Open Group. This specification divides the completion of a transaction into two phases: a prepare phase, and a commit phase.

A transaction completion sequence with two participants is described below. Resource One is connected to the application server with Resource Adapter One, Resource Two with Resource Adapter Two. Each participant has its own TLOG. Thus, overall there are three TLOGs: one which is maintained by the TM, and two more which are controlled by their respective resource managers.

The transaction completion process is as follows:

1. The application asks the application server to commit the transaction.

2. The application server informs the TM that the transaction should be completed.

3. The TM initiates the first phase of the transaction completion: It asks the first resource manager (RM) to prepare the transaction.

4. We assume that the first RM is able to commit and writes this intent to its own transaction log. The first RM returns from the prepare call signaling the TM success.

5. The same happens for the second RM.

6. As we assume the TM received only successful prepare return codes it decides to commit the complete transaction. The TM writes its decision to commit in his own TLOG before it reaches out to the RMs. After the write operation, the TM will try to commit this transaction even if it crashes immediately after the write.

7. The first RM is asked to commit. Normally it should deliver on the promise it gave to the TM during prepare time and commit without any problem.

8. The second RM is asked to commit.

A problem before any prepare call is made is not critical. After some time each participant will abandon the transaction which leads finally again to a consistent state.

More critical are problems after prepare. An example could be an application server crash after step 7 but before step 8. This would lead to Resource Manager One having committed its transaction branch already and Resource Manager Two still staying in the prepare state.

If this situation endures, Resource Manager Two will (after some time) decide itself about the outcome of its transaction branch. It will make a heuristic decision. Many existing resource managers will decide to roll back their branch. If this should happen, the overall transaction is inconsistent. The DTP XA specification calls this a "heuristic mixed transaction outcome".

Furthermore, the completion process can take a while, especially if resource managers are slow. Imagine a slow RM One: If there is a failure during the second phase of the 2PC (2 phase commit) protocol, the overall transaction is inconsistent. In many current implementations of the application server, this inconsistency will go unnoticed so chances are pretty high that customer data can become corrupted.

Existing application servers then attempt recovery of these distributed transactions using a recovery service.

SUMMARY

Embodiments of the present invention improve transaction recovery in a distributed computing environment. In one embodiment the present invention includes a system for transaction recovery in a distributed computing environment. The system includes a transaction log server, application servers, and resource servers. The transaction log server stores a shared transaction log. The application servers implement a distributed transaction application and accesses the shared transaction log when performing a transaction using the distributed transaction application. The resource servers store data and that operate with the application servers to access the data according to the transaction. If one of the application servers fails, another application server assumes responsibility for a portion of the shared transaction log that was previously accessed by the failed application server.

According to an embodiment, a computer program controls transaction recovery in a distributed computing environment. The computer program controls the transaction log server, application servers, and resource servers to function as described above.

According to an embodiment, a method controls transaction recovery in a distributed computing environment. The method controls the transaction log server, application servers, and resource servers to function as described above.

The following detailed description and accompanying drawings provide a better understanding of the nature and advantages of the present invention.

DETAILED DESCRIPTION

Described herein are techniques for transactional recovery. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

An embodiment of the present invention does not use a single recovery service approach. Instead there may be multiple recovery services in place which can recover pending transactions in parallel. To avoid conflicts between these recovery services, the transaction log may be divided into several logical parts where each part can be taken by at most one recovery service.

This results in quicker recovery (the recovery service which lives on the node with the least load will win the competition for orphaned transaction logs) and higher throughput (if there are several orphaned transaction logs they will be processed in parallel by different recovery services on different nodes).

An embodiment of the present invention defines an architecture where any of the surviving application server nodes can recover these pending transactions instantly without dedicating one member of the cluster as a single recovery node.

Each application server node creates a new (logical) Transaction Log at each start. If this node crashes, recovery services living on the surviving nodes compete for the orphaned transaction log and recover the transactions contained in it.

Thus, there may be several recovery services in parallel in place which can recover transactions in parallel.

An embodiment of the present invention may have one or more of the following features. One feature is that if a application server node crashes, recovery of transactions may happen quickly. This helps to avoid any delay that would increase the risk of heuristic resource manager decisions. This results from performing recovery on another surviving application server node than to wait for the restart of the crashed node. Another feature is that if a resource manager is temporarily not able to perform transaction processing (maybe due to a network outage or a crash of the resource manager), the transaction manager may continuously try to contact this resource manager to resolve any pending transaction branch as quick as possible. Both tasks—instant recovery and resolving pending transactions—may be addressed according to an embodiment of the present invention by the same application server service which may be referred to as the Pending Transaction List (PTL) Processor. Before detailing the operation of the PTL Processor, some context is provided.

Figure 1:
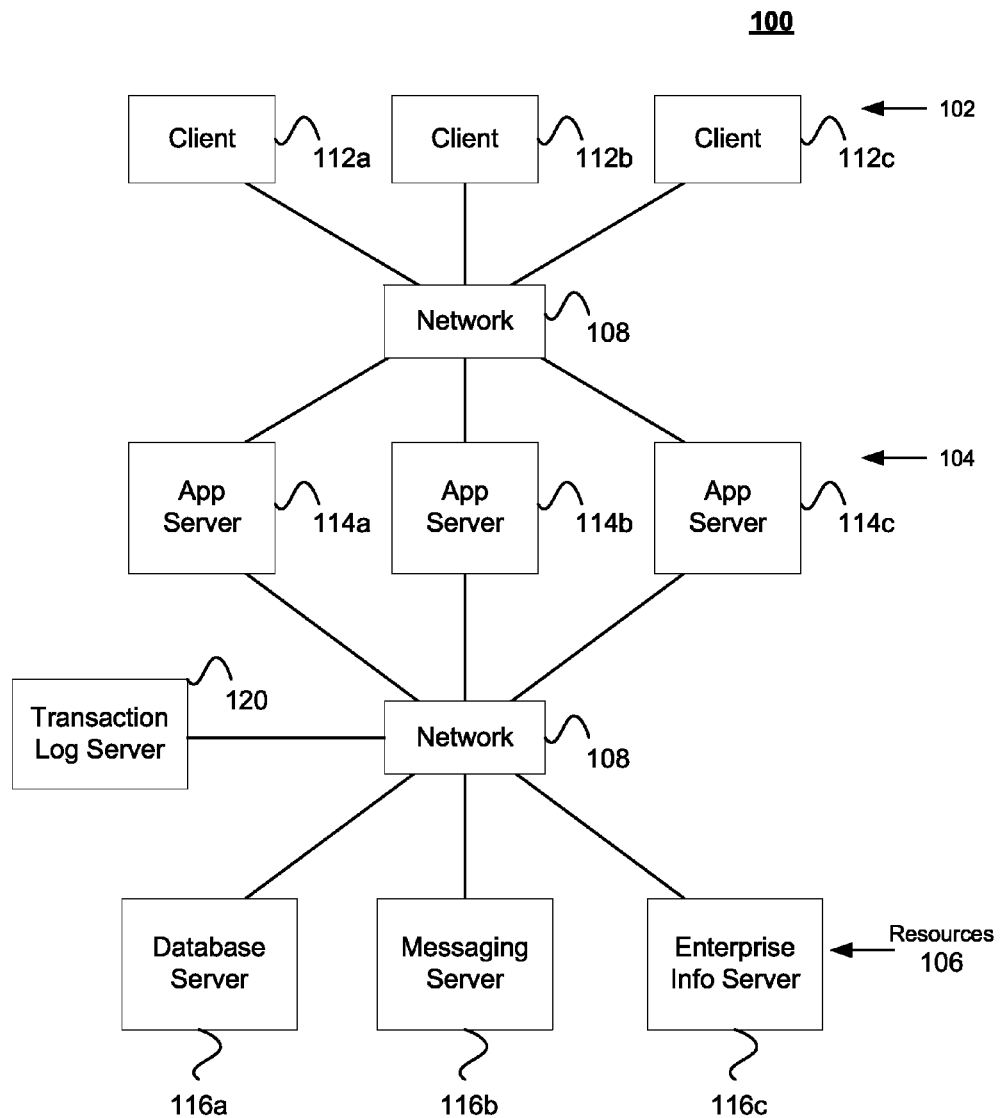
FIG. 1 is a block diagram of a distributed computing environment according to an embodiment of the present invention.

FIG. 1 is a block diagram of a distributed computing environment 100 according to an embodiment of the present invention. The distributed computing environment 100 has three tiers: a client tier 102, an application tier 104, and a database tier 106. More or fewer tiers may be present in alternative embodiments; three tiers are shown as they provide a general case for convenient discussion.

A network 108 connects the tiers and the computing devices within a particular tier. The network 108 is shown as two reference blocks; such presentation is for illustration purposes given the three tiers. It is to be understood that the network 108 may include subnetworks (e.g., a first local area network, a second local area network, the internet, etc.) or may connect to other networks (not shown).

The client tier 102 includes one or more client computers 112. Three client computers 112a, 112b and 112c are shown. In general, the client computers 112 provide a user interface and enhance the ability of a user to interact with the distributed computing environment 100.

The application tier 104 includes one or more application servers 114. Three application servers 114a, 114b and 114c are shown. In general, the application servers 114 execute applications programs that interact with the database tier 106 for data access and with the client tier 102 for presentation of the data.

The database tier 106 includes one or more resource servers 116. Three resource servers 116 are shown: a database server 116a, a messaging server 116b, and an enterprise information server 116c. In general, the resource servers 116 manage data that is accessed by the application servers 114.

According to an embodiment, the distributed computing environment 100 operates according to the Java™ Enterprise Edition environment. For example, the client computers 112 may implement web browsers that exchange information in Java™ format with the application servers 114. The application servers 114 may generate SQL (structured query language) statements that are executed by the resource servers 116.

A transaction log server 120 maintains a shared transaction log and is discussed in more detail below.

Figure 2:
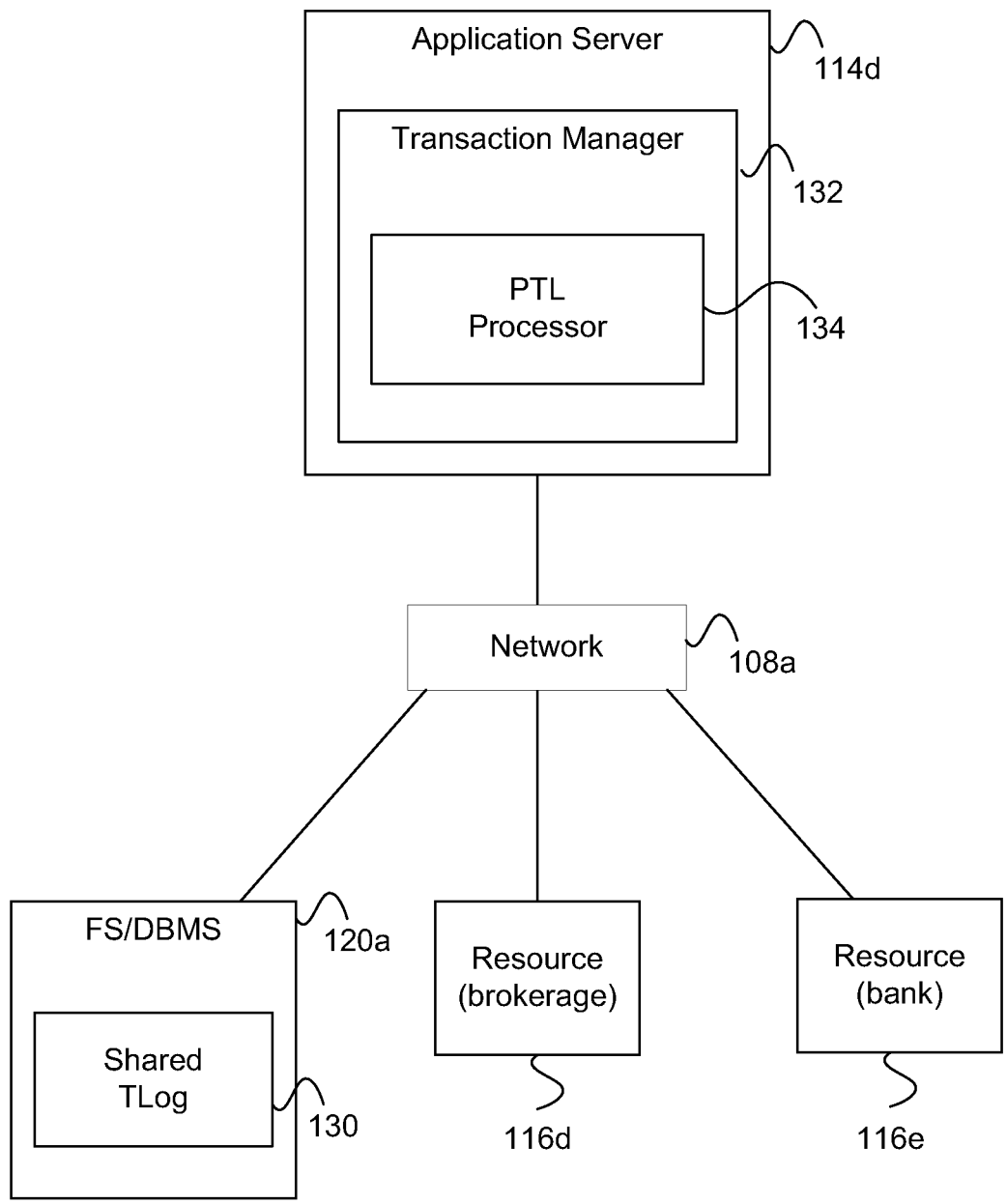
FIG. 2 is a block diagram showing more details of some of the components of the distributed computing environment of FIG. 1.

FIG. 2 is a block diagram showing more details of some of the components of the distributed computing environment 100. Shown are an application server 114d, resource servers 116a and 116b, a network 108a, and a transaction log server 120a. (The components of FIG. 2 correspond to the components of FIG. 1 having similar labels.)

As an example, the application server 114d may implement a stock transaction computer program. The resource server 116d stores data corresponding to the user's brokerage account, and the resource server 116e stores data corresponding to the user's bank account.

The transaction log server 120a stores a shared transaction log 130. According to an embodiment, the transaction log server 102a is a database server, and the shared transaction log 130 is a data structure in a database stored by the database server (e.g., a database management system or DBMS). According to an embodiment, the transaction log server 102a is a file system server, and the shared transaction log 130 is a data file that is stored by the file system server. The file system server may be a storage device such as a NAS (network attached storage) device or a SAN (storage area network) device. The shared transaction log 130 may also be referred to as the TLOG 130.

The application server 114d includes a transaction manager 132 and a PTL processor 134. The transaction manager 132 manages transactions executed by the application server 114d. For example, referring to the brokerage example discussed above, the transaction manager 132 manages the steps of executing a stock purchase transaction, for example: communicating with the bank account server to lock a purchase amount; communicating with the brokerage server to lock a quantity of stock for purchase; communicating with the bank account server that the stock purchase has been locked, so that the bank account server can move the money from the buyer's account to the broker's account; and communicating with the brokerage server that the money has been moved, so that the brokerage server can move the stock from the broker's account to the buyer's account.

The PTL processor 134 (also referred to as the recovery service) combines two abilities in a decentralized fashion. One ability is the recovery of pending transactions which have been created on the application server 114d (where the PTL processor 134 is implemented) since the last start of the application server 114d. Another ability is the recovery of pending transactions which are leftovers of other application servers 114 which have crashed.

On each application server 114 is implemented one PTL processor 134. There is no need for one PTL processor 134 to differs from the others; e.g. there is no need for a singleton PTL processor that functions for the overall environment.

As an example, assume that a cluster of nodes in the application tier 104 (see, e.g., application servers 114 in FIG. 1) consists of nodes "a, b, c, d" which are started. Assume that each node has pending transactions. As this is defined as the first start of all nodes, each PTL processor of each node cares only for transactions originated from the node that each PTL processor is implemented on.

The abbreviation "a:a(1)" stands for the situation when "node a" tries to resolve pending transactions generated during run number "1" of node "a". Thus, the situation is "a:a(1), b:b(1), c:c(1), d:d(1)".

Assume that node a crashes and has some pending transactions. Any of the remaining nodes is able to take over these transactions. We assume node b is the quickest. Thus, the situation is now "b:b(1)+a(1), c:c(1), d:d(1)".

Now assume node b crashes. Again, node c and node d compete. It is possible and very likely that node c and node d will only partly take over the pending transactions that node b was trying to resolve. One outcome could be "c:c(1)+b(1), d:d(1)+a(1)".

If node a comes up again, it need not necessarily take care for the transactions from its earlier run. This is because it is highly likely that some other node already cares for them. So situation would be "a:a(2), c:c(1)+b(1), d:d(1)+a(1)".

As a result of this, the TLOG may be logically segmented into different parts which can have different owners. As we allow either the file system or a DBMS to be used as underlying persistence layer for the TLOG this may be achieved by two options. One option is the file system based TLOG. Each start of a node creates a new physical file. The file system may be shared between nodes so that a node can take over the TLOG of another node. Another option is the DBMS based TLOG. There may be only one set of shared tables for all nodes. The database schema allows the DBMS to differentiate between entries from different nodes and different node startups.

Figure 3:
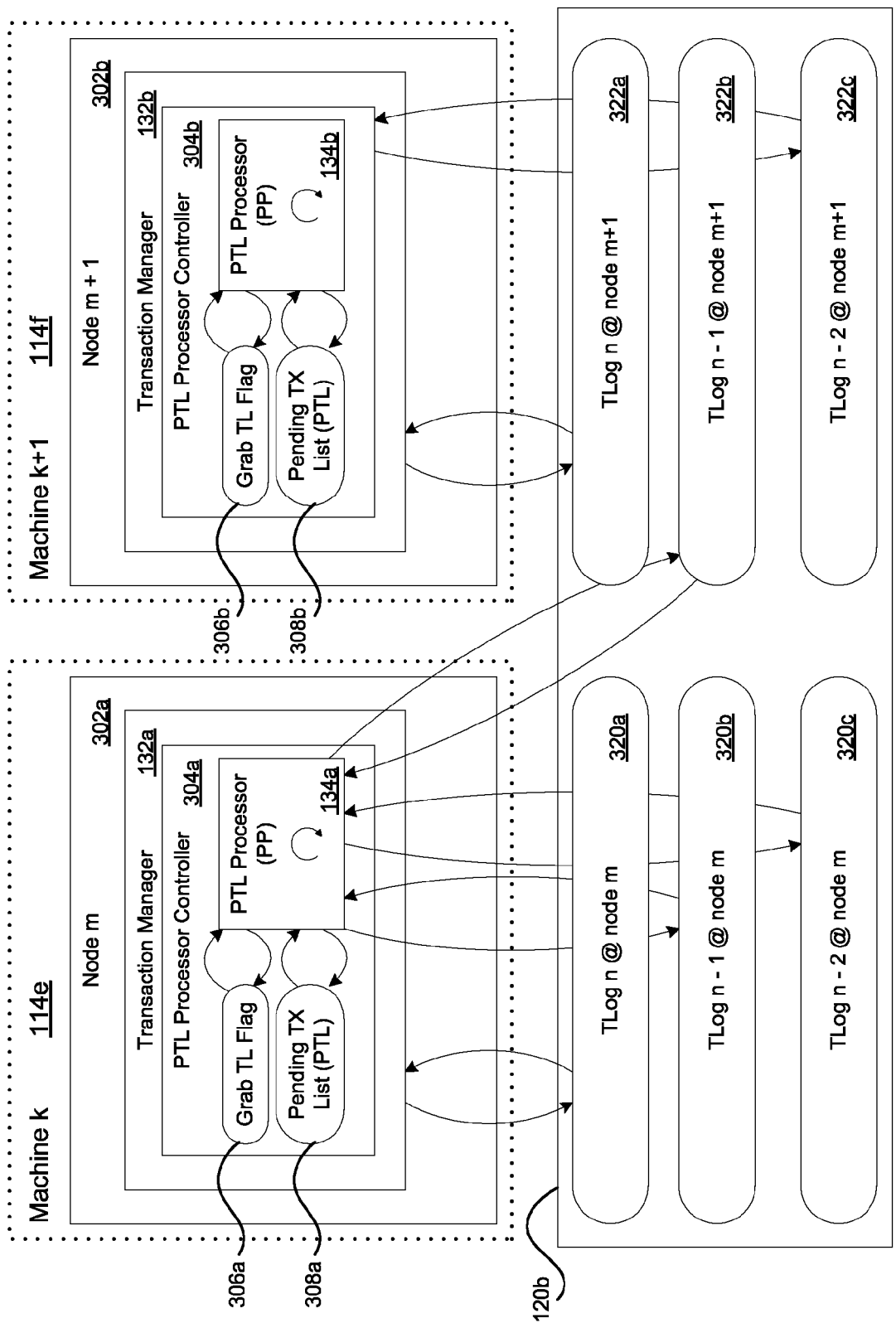
FIG. 3 is a block diagram showing more details for two application servers and a transaction log server according to an embodiment of the present invention.

FIG. 3 is a block diagram showing more details for two application servers 114e and 114f and a transaction log server 120b according to an embodiment of the present invention. The application server 114e includes a node m 302a, a transaction manager 132a, a PTL processor controller 304a, a grab TL flag 306a, a pending transaction list 308a, and a PTL processor 134a. The application server 114f includes a node m+1 302b, a transaction manager 132b, a PTL processor controller 304b, a grab TL flag 306b, a pending transaction list 308b, and a PTL processor 134b. The nodes 302a and 302b may be viewed as instances of an application computer program.

The transaction log server 120b includes six transaction logs 320a, 320b, 320c, 322a, 322b, and 322c. The transaction logs 320a, 320b, 320c, 322a, 322b, and 322c are shown as separate logical entities. The logical transaction logs 320a, 320b, 320c, 322a, 322b, and 322c may be physically stored as a single physical data structure such as a file or a database structure by the transaction log server 120b. The transaction logs 320a, 320b and 320c are associated with the application server 114e, and the transaction logs 322a, 322b and 322c are associated with the application server 114f.

As shown in FIG. 3, the two application server nodes 302a and 302b (m and m+1) from which we assume they live on different physical boxes (application servers 114e and 114f). Transaction processing is conducted by the Transaction Managers 132a and 132b. The PTL Processors 304a and 304b are part of the respective TMs 132a and 132b, but each runs in a thread of its own.

One noteworthy data structure with regard to the PTL Processor 134a is the Pending Transaction List (PTL) 308a. The pending transaction list 308a may be an in-memory structure. The pending transaction list 308a contains the list of transactions which need to resolved.

For resource optimization the PTL processor 134a can be stopped if there are no entries in the PTL 308a. This is shown in FIG. 3 where the PTL processor 134a is running within the PTL Processor Controller 304a which controls the lifecycle of the PTL Processor 134a.

There are two ways which could lead to the addition of PTL entries:

1. If the TM 132a encounters a problematic transaction (e.g. one which had failures during the second phase of a 2PC commit protocol) it adds this transaction to the PTL 308a and continues with serving the application request.

2. If one of the cluster nodes 302b crashes the cluster infrastructure sets the "Grab Transaction Log" flag off all other cluster nodes to true. (E.g., with only one other node 302a shown, this is the Grab TL Flag 306a.) This instructs all other PTL Processors (e.g., with only one other node 302a shown, this is the PTL processor 134a) to begin a cycle where they try to gain exclusive access to orphaned transaction logs and to copy their content into their respective PTL (again, with only one other node, this is the PTL 308a).

The Transaction Log 130 (see FIG. 1) consists of different logical Transaction Log entities (e.g., 320a, 320b, 320c, 322a, 322b, and 322c). One logical TLog (e.g., 320a) can have only one PTL processor (e.g., 134a) or TM (e.g., 132a) as owner. In FIG. 3 the following situation is illustrated:

The TM 132a of node m 302a writes into TLog n 320a which is created at the last startup of this node m 302a. The label "n" may be referred to as a run identifier.

The PTL Processor 134a of node m 302a is resolving transactions from the last run of this node and the previous two runs. This is shown as read/write access to TLog n−1 320b and n−2 320c of node m 302a.

The PTL Processor 134a of node m 302a is resolving transactions from the last run of node m+1 302b. This is shown with read/write access arrows to TLog n−1 322b of node m+1 302b.

The TM 132b of node m+1 302b writes into TLog n 322a of node m+1 302b which was freshly created at the last startup.

The PTL Processor 134b of the node m+1 302b resolves currently transactions from the run before the last run. This is shown with arrows to TLog n−2 322c of node m+1 302b.

If all transactions of a particular logical transaction log (e.g., 320c) are resolved, it gets removed by the PTL processor (e.g., 134a). There may be a configurable time-out after which unrecoverable transactions become abandoned (typically something like one day). So after some time old TLogs (e.g., 320c) will vanish.

Figure 4:
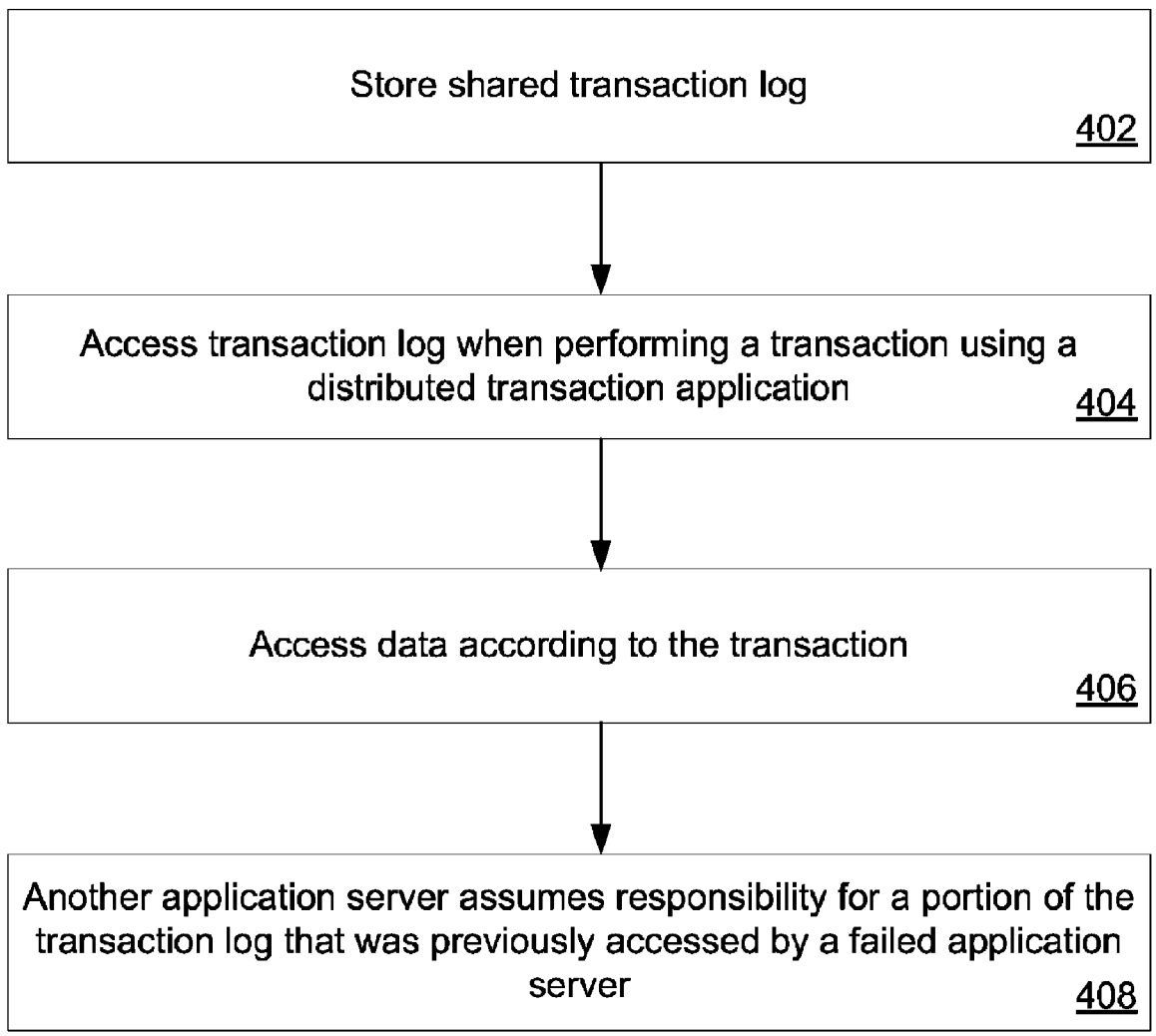
FIG. 4 is a flowchart of a method of transaction recovery in a distributed computing environment according to an embodiment of the present invention.

FIG. 4 is a flowchart of a method of transaction recovery 400 in a distributed computing environment according to an embodiment of the present invention. The method 400 may be implemented by the distributed computing environment 100 (see FIG. 1).

In step 402, a shared transaction log is stored.

In step 404, the shared transaction log is accessed when performing a transaction using a distributed transaction application. The distributed transaction application is implemented by a number of application servers.

In step 406, data is accessed according to the transaction. The data access may be performed according to a 2PC (2 phase commit) procedure.

In step 408, if one of the application servers fails, another of the application servers (referred to as the active application server) assumes responsibility for a portion of the shared transaction log that was previously accessed by the failed application server. Since only one application server can be responsible for a particular portion of the shared transaction log, generally the application server with the lowest load will be the quickest to respond to the failure and will become the active application server, taking responsibility over the failed application server's transaction log entries.

Detailed Example Embodiments

The following sections provide more details regarding the structures and processes described above. Some repetition may be present in order to provide context for the additional details.

1. Overview

There are four noteworthy components that care for transactions and their recovery in the application server. These include the transaction manager (TM), the transaction log (TLOG), the pending transaction list (PTL), and the PTL processor (PP). (See, for example, FIG. 3.)

The Transaction Manager (e.g., 132a in FIG. 3) may be implemented as part of the NetWeaver Java Server from SAP AG. The TM coordinates transactions. According to an embodiment, the TM is multi-threaded which means that a transaction is always started in the thread of the application. If the TM decides to commit a transaction it writes an entry for this transaction to a persistent transaction log (TLOG). This happens before any commit call is performed to any of the involved Resource Managers (RMs). So the TM logs its intend to commit and not the result of any commit operation.

If there is no entry for a transaction in the TLOG it means the TM decided to roll back the transaction. According to an embodiment, this way of updating the TLOG is may be performed according to the "Presumed-Abort" strategy. See Weikum and Vossum, Transaction Information Systems, Chapter 19, Distributed Transaction Recovery (Academic Press 2002).

Some error conditions make it impossible for the TM to bring a two-phase commit transaction into a consistent state immediately. For a detailed description of theses situations read the following sections about Resource Manager Errors. In such a case the TM is not blocking the application thread any longer but hands the transaction over to a list of pending transactions (PTL).

The TLOG (e.g., 320a in FIG. 3) stores the decisions of the TM to commit transactions. It can be stored in a system DBMS or a filesystem. According to an embodiment, for each start of a TM, a new logical TLOG gets created. In the filesystem this may result in many physical TLOGs.

The PTL (e.g., 308a in FIG. 3) is a in-memory structure according to an embodiment. It contains transactions which can currently not get resolved because one ore several RMs which are involved have a problem (e.g., failure). An entry in the PTL can mean that the transaction must be committed or that it must be rolled back. Additionally each entry tracks the state of each transaction branch—so it is always clear which RM returned what result and which RM could not successfully be reached until now.

The PTL Processor (e.g., 134a in FIG. 3) tries to resolve the transactions in the PTL. It does this by looping over all entries in the PTL. The PTL processor and the TM handle transactions in an identical way. This means that all RM error handling which gets described later is absolutely the same for the TM and the PP. The only difference is that PTL handling is happening in a thread of its own and not in the one of the application request.

The PP has additionally the possibility to read in transactions from external transaction logs. So the PTL can contain entries which point to many TLOGs.

2. Transaction Manager

A transaction manager has to deal with the sophisticated return codes a resource manager (RM) can provide during the different phases of the 2PC protocol. Additional complexity is added in an embodiment in which the different resource managers implementing the XA resource interface might have a different interpretation which return code should be chosen in a certain situation. As well the different specifications around transactions are sometimes vague or incomplete.

To deal with this, an embodiment implements the official Open Group XA Specification as the source of interpretation if it comes to return codes. This means that the TM (according to an embodiment) will even deal with return codes which are not mentioned in the JSR-000907 Java™ Transaction API Specification but only in the Open Group XA specification. Even if these return codes are not mentioned in the Java™ documents we expect them to happen in the real world as some Java™ resource managers are only thin Java™ wrappers around already existing C/C++ resource manager implementations.

2.1 Resource Manager Errors Before the Prepare Phase

Before the Prepare-Phase, error handling is not as complex as after prepare. It can be expected that all involved parties rollback their part of the transaction even if they lose contact with each other so inconsistencies should only survive a relatively short time. Despite that, the different operations of the JTA XAResource interface during that phase need a closer look:

Operation: start (Xid xid, int flags)

According to an embodiment, a connection should always be pinned to the transaction. So the only value for the flags used is TMNOFLAGS. According to an alternate embodiment, connections may be suspended and resumed with end (TMSUSPEND) and start(TMJOIN). This would result in using less connections but may have a negative performance impact. An additional risk is that some RMs might not implement proper transaction suspend mechanisms.

Operation: end (Xid xid, int flags)

According to an embodiment, only TMSUCCESS is used. According to an alternate embodiment, an optimizations would be to call end(TMFAIL) if the TM decides to rollback. This would save an additional rollback call on the involved RMs. As it is not clear whether all RMs support this optimization and because only a low percentage of transactions will be rolled back, the alternative embodiment may be undesirable in some implementations.

If the return code is anything else than XA_OK then the complete transaction will be rolled back. (To be more precise in Java the XA return codes which are not XA_OK become translated into Exceptions.) If the return code is XA_RB* then the complete transaction will be rolled back but not rollback call will be issued at the RMs returning this code.

Operation: prepare (Xid xid)

According to an embodiment, if a RM returns RDONLY it will be excluded from the transaction immediately. No entry for this branch will be written to the TLOG. An RDONLY result is not a vote to commit and not a vote to rollback.

If XA_RB* is returned the transaction will be rolled back but no rollback will be called on these particular RMs. They voted for rollback and have performed a rollback already. If all prepare calls are successful the TM decides to commit the transaction.

Operation: commit(Xid xid, boolean onePhase)

According to an embodiment, if onePhase is set to true then the transaction is treated like a local one. So there is no write to the TLOG. If onePhase is set to false we have a full blown 2PC transaction with quite complicated erroneous outcomes.

The following sections describe in more detail how these possible errors will be treated.

2.2 Resource Manager Errors During the Commit Phase

According to an embodiment, during the commit phase the TM calls all the RMs enlisted in the transaction and asks them to commit. According to an embodiment, this is done in a sequential manner and not in a parallel one. According to an alternate embodiment, a parallel approach may be used to lead to shorter transaction latency but involves additional overhead for the synchronization of the different RM commit return results. One noteworthy aspect behind the TM architecture is to reach maximum transactional throughput and not minimum transaction latency.

Figure 5:
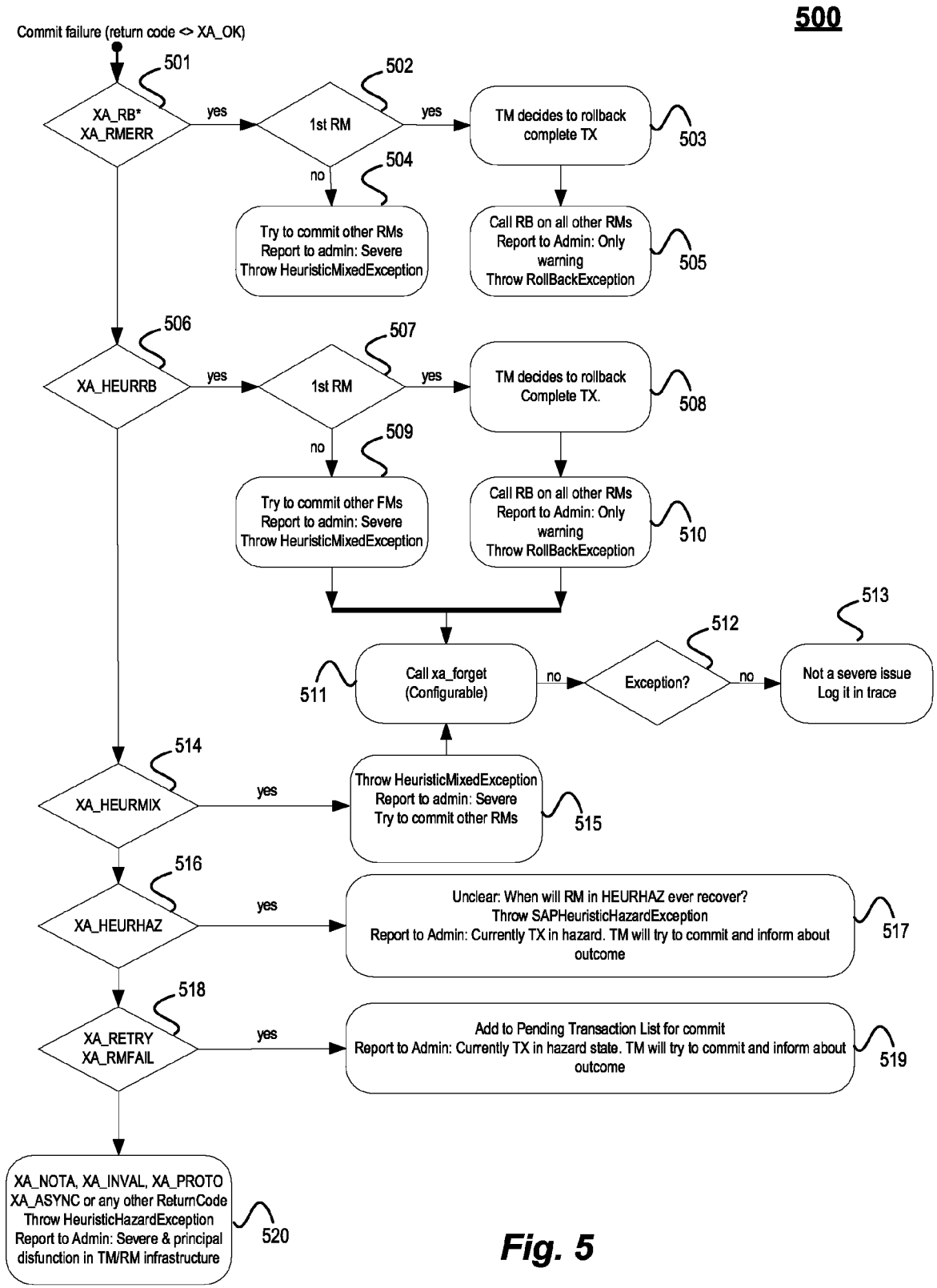
FIG. 5 is a flowchart of an activity diagram that illustrates the point of time when all resource managers have successfully prepared, according to an embodiment of the present invention.

FIG. 5 is a flowchart 500 of an activity diagram that illustrates the point of time when all RMs have successfully prepared, according to an embodiment of the present invention. The TM decided to commit the transaction and subsequently calls commit on each enlisted RM. It is assumed that the RM could not deliver on the promise it made during the prepare phase and returned not XA_OK to the TM. Depending on the specific error code the RM provided different actions will be taken. The TM loops over each RM enlisted in the transaction, so the described flow of execution in FIG. 5 will be applied to each RM. Sometimes FIG. 5 shows that forget is called on a RM. According to an embodiment, this happens not immediately but after the complete transaction is finished.

In step 501, if XA_RB* or XA_RMERR is true, the process proceeds to step 502; if not, the process proceeds to step 506. XA_RB* stands for a whole variety of return codes: XA_RBROLLBACK, XA_RBCOMMFAIL, XA_RBDEADLOCK, XA_RBINTEGRITY, XA_RBOTHER, XA_RBPROTO, XA_RBTIMEOUT, and XA_RBTRANSIENT. For the TM behavior the detailed XA_RB* reason is irrelevant. The XA Specification summarizes: "[XA_RB*]: The resource manager did not commit the work done on behalf of the transaction branch. Upon return, the resource manager has rolled back the branch's work and has released all held resources." This basically means the transaction was rolled back and the RM already forgot about it.

For XA_RMERR the XA Specification states: "An error occurred in committing the work performed on behalf of the transaction branch and the branch's work has been rolled back. Note that returning this error signals a catastrophic event to a transaction manager since other resource managers may successfully commit their work on behalf of this branch. This error should be returned only when a resource manager concludes that it can never commit the branch and that it cannot hold the branch's resources in a prepared state. Otherwise, [XA_RETRY] should be returned."

So we can be sure the transaction branch has been rolled back and the transaction is no longer in a pending state.

In step 502, if the failing RM is the first RM in the transaction, then the TM changes its mind about committing the transaction as a whole (and proceeds to step 503). Instead it will try to roll back the other RMs as well so after transaction end there is again a consistent state (see step 503). Otherwise the processing proceeds to step 504.

In step 503, the TM decided to roll back the transaction. There is no update of this change of the TM's mind written to the TLOG. This might sound surprising because there is already an entry in the TLOG which means that the TM decided to commit. But even if there's a crash during the rollback attempt the PTL Processor will do the same things as the TM because it implements the same logic like the TM. This means the PTL processor will find the transaction in the TLOG. It will try to commit it, find out that the first RM rolled back which will result in the decision to roll back the complete transaction. The processing then proceeds to step 505.

In step 504, the TM knows for sure one transaction branch which was not the first one was rolled back. So there is a heuristic mixed situation—meaning the TM knows for sure the transaction is inconsistent. The TM tries to commit other RMs. The TM may report to the admin a Severe error and may throw a HeuristicMixedException.

In step 505, as the whole transaction is now marked for roll back the TM will roll back all RMs enlisted in the transaction. The administrator gets only a warning as the transaction is still consistent. Finally the TM will throw a RollBackException.

In step 506, if XA_HEURRB is true, the processing proceeds to step 507; if not, processing proceeds to step 514.

For XA_HEURRB the XA specification states: "Due to a heuristic decision, the work done on behalf of the specified transaction branch was rolled back." This is completely identical to the situation in step 501 except in this case the RM will remember this transaction even if it is finished unless it is allowed to forget about it in step 511. The XA spec states as part of the xa_commit function: "If a resource manager already completed the work associated with *xid heuristically, this function merely reports how the resource manager completed the transaction branch. A resource manager cannot forget about a heuristically completed branch until the transaction manager calls xa_forget ( )."

Steps 507-510 are similar to steps 502-505, respectively, except the processing proceeds to step 511 from steps 509 and 510.

In step 511, as long as calling xa_forget ( ) is not configurable, the processing proceeds to step 512. In principle it should be configurable whether the TM requests the RM to forget about this branch. If there are skilled DBMS administrators which know how to use this heuristic transactional DBMS state then the task of forgetting the branch should be handed over to the DBMS administrator. If there is an unadministrated environment then the TM should remove the RM's memory about this transaction branch.

In step 512, as long as there is no exception, processing proceeds to step 513. If there is an exception during forget it might or might not be that the RM has forgotten about this branch. As this has no influence on the consistency of the transaction the TM does not retry to call forget on the RM at a later time.

In step 513, since step 512 does not result in a severe issue, instead of the contingencies of step 512, an error is logged to the trace so an interested administrator could find out about the problems during forget.

In step 514, if the RM returns XA_HEURMIX, the processing proceeds to step 515, otherwise the processing proceeds to step 516.

In step 515, if the RM returns XA_HEURMIX it is most likely another transaction manager—although even a DBMS could possibly report a mixed outcome. The transaction as a whole is now heuristically mixed—so we try to commit the other RMs and throw a HeuristicMixedException. After that we continue with the same XA forget logic like in the XA_HEURRB case (step 511, etc.).

In step 516, if XA_HEURHAZ is true, processing proceeds to step 517, otherwise processing proceeds to step 518.

In step 517, if a heuristic hazard situation is encountered then the RM does not know the state of the transaction branch. This might be a temporary situation or a permanent one.

According to an embodiment, XA_HEURHAZ is treated as a permanent return code. Regarding exceptions: JTA only knows RollbackException, HeuristicMixedException, HeuristicRollbackException, SecurityException, IllegalStateException, and SystemException. According to an embodiment, HeuristicMixedException is extended with a SAP proprietary SAP HeuristicHazardException and throw it. This gives the application catching the exception with ex.getcause( ) the possibility to react.

According to an embodiment in which XA_HEURHAZ is considered to be transient, the transaction will be transferred to a "Pending Transaction List" (PTL) with the objective to be committed. The PTL entry as well includes information about the results of the different branches involved in the transaction. The PTL Processor will take care for executing the PTL at a later point of time. If the process owning this list dies this non-persistent entry in this list is lost as well. This does not lead to any problem as the PTL Processor will find this transaction again the TLOG at recovery time. So the transaction will not be forgotten.

In step 518, if XA_RETRY or XA_RMFAIL is true, processing proceeds to step 519; otherwise processing proceeds to step 520.

In step 519, the TM adds the transaction to the PTL for commit and reports the hazard state to the administrator.

For XA_RETRY the DTP Specification says: "The resource manager is not able to commit the transaction branch at this time. This value may be returned when a blocking condition exists and TMNOWAIT was set. Note, however, that this value may also be returned even when TMNOWAIT is not set (for example, if the necessary stable storage is currently unavailable). This value cannot be returned if TMONEPHASE is set in flags. All resources held on behalf of *xid remain in a prepared state until commitment is possible. The transaction manager should reissue xa_commit( ) at a later time."

For XAER_RMFAIL the DTP Specification states: "An error occurred that makes the resource manager unavailable."

In summary, the TM will not delay the thread of control any longer and try to commit this branch at a later time. So the branch will be added to the PTL with intention to be committed. According to an embodiment, the exception thrown will be the SAP proprietary SAPHeuristicHazard Exception which extends the JTA HeuristicMixedException. The reason why the JTA Exceptions is extended is that there is a difference if there might be an inconsistent transaction (heuristic hazard) or there is an inconsistent transaction for sure (heuristic mixed). This difference was visible in the XA Specification but got lost in the JTA Specification.

In step 520, if the TM reaches this activity something severe went wrong during transaction handling: It might be a failure within the RM, within the TM or in between. As well a human administrator might have interfered with transactional state. Here is a list of things which are possible (quoted material taken from the DTP XA Specification):

"[XAER_NOTA] The specified XID is not known by the resource manager." This could be the case if an administrator decides to commit or rollback manually this pending transaction.

"[XAER_INVAL] Invalid arguments were specified." This points to an error within the RM or the RM XA driver.

"[XAER_PROTO] The routine was invoked in an improper context." This points to an error in the TM implementation.

"[XAER_ASYNC] TMASYNC was set in flags, and either the maximum number of outstanding asynchronous operations has been exceeded, or TMUSEASYNC is not set in the flags element of the resource manager's xa_switch_t structure." Java™ does not support the notion of asynchronous transactions so this points to an error in the RM or the RM XA driver.

If the return code is something else then it's a code not mentioned in the DTP XA Specification. This should never happen.

2.3 Resource Manager Errors During the Rollback Phase

If one of the branches voted for rollback during the prepare phase the TM will try to rollback the complete transaction. To do so, according to an embodiment, the TM loops over all enlisted RMs in a sequential manner. If one of these RMs returns an error it will not stop the TM to continue rolling back the other RMs. Everything except XA_OK is considered to be an error—might it be a XA return code or another exception.

Figure 6:
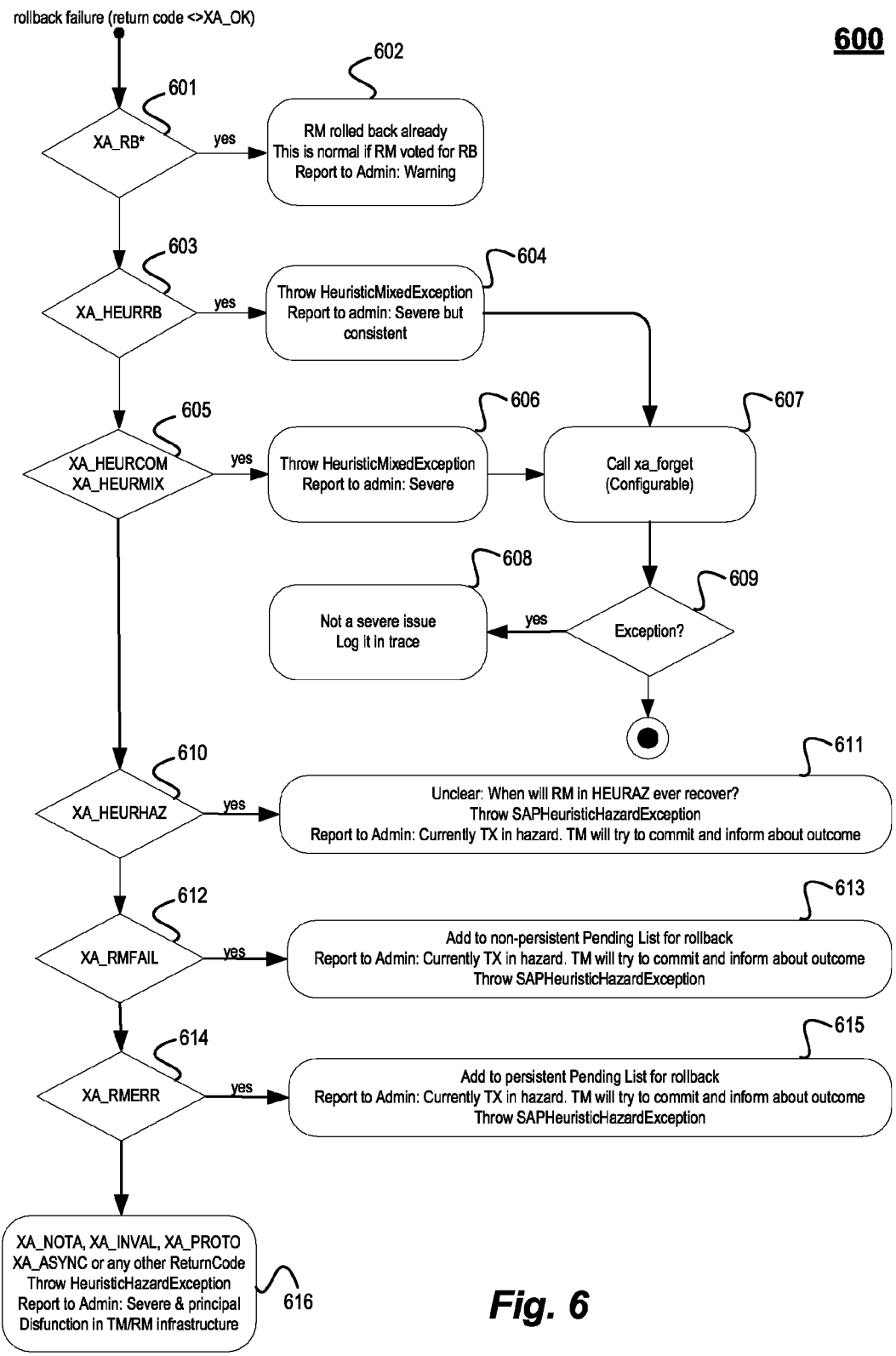
FIG. 6 is a flowchart of an activity diagram that outlines how the transaction manager handles return codes, according to an embodiment of the present invention.

FIG. 6 is a flowchart 600 of an activity diagram that outlines how the TM will handle each of the possible XA return codes, according to an embodiment of the present invention.

In step 601, if XA_RB is true, processing proceeds to step 602; otherwise processing proceeds to step 603. XA_RB* stands for a whole variety of return codes:

XA_RBROLLBACK, XA_RBCOMMFAIL, XA_RBDEADLOCK, XA_RBINTEGRITY, XA_RBOTHER, XA_RBPROTO, XA_RBTIMEOUT, and XA_RBTRANSIENT.

In step 602, for the TM behavior the detailed XA_RB* reason is irrelevant. The XA Specification summarizes: "[XA_RB*]: The resource manager has rolled back the transaction branch's work and has released all held resources. These values are typically returned when the branch was already marked rollback-only." This basically means the transaction was rolled back and the RM already forgot about it. This might the normal behavior for some RMs if they voted for rollback during prepare. We inform the admin with a warning.

In step 603, if XA_HEURRB is true, processing proceeds to step 604; otherwise processing proceeds to step 605.

In step 604, the RM rolled back already heuristically although the TM didn't tell him so. The XA Specification states: "Due to a heuristic decision, the work done on behalf of the specified transaction branch was rolled back. A resource manager may return this value only if it has successfully prepared *xid." Because the TM wanted to roll back anyway this will not lead to an inconsistent state for the transaction. The TM throws a HeuristicRollbackException and informs the administrator about the heuristic decision of this RM. The processing then proceeds to step 607.

In step 605, if XA_HEURCOM or XA_HEURMIX is true, processing proceeds to step 606, otherwise processing proceeds to step 610.

In step 606, for HEUR_COM the XA spec states: "Due to a heuristic decision, the work done on behalf of the specified transaction branch was committed. A resource manager may return this value only if it has successfully prepared *xid." For HEUR_MIX the XA Specification states: "Due to a heuristic decision, the work done on behalf of the specified transaction branch was partially committed and partially rolled back. A resource manager may return this value only if it has successfully prepared *xid."

In summary, the transaction is now definitely in an inconsistent state so the TM will throw a HeuristicMixedException and inform the admin about that. The processing then proceeds to step 607.

In step 607, whenever a heuristic return code is given back by the RM the TM can call xa_forget on this resource. Whether this should happen can be configured by the administrator. The processing then proceeds to step 609.

In step 608, if there is an exception during forget (see step 609) it might or might not be that the RM has forgotten about this branch. As this has no influence on the consistency of the transaction the TM does not retry to call forget on the RM at a later time. Instead of that an error is logged to the trace so an interested administrator could find out about the problems during forget.

In step 609, if there is an exception during forget, processing proceeds to step 608, otherwise processing stops.

In step 610, if XA_HEURHAZ is true, processing proceeds to step 611, otherwise processing proceeds to step 612.

In step 611, if we encounter a heuristic hazard situation then the RM does not know the state of the transaction branch. This might be a temporary situation or a permanent one. According to an embodiment, XA_HEURHAZ is assumed to be a permanent return code. Regarding exceptions: JTA only knows RollbackException, HeuristicMixedException, HeuristicRollbackException, SecurityException, IllegalStateException, and SystemException. According to an embodiment, HeuristicMixedException extended with a SAP proprietary SAP HeuristicHazardException and it is thrown. This gives the application catching the exception with ex.getcause( ) the possibility to react.

According to an embodiment in which if XA_HEURHAZ is considered to be transient, the transaction is transferred to a "Pending Transaction List" (PTL) with the objective to be rolled back. The PTL entry as well includes information about the results of the different branches involved in the transaction. The PTL Processor will take care for executing the PTL at a later point of time. If the process owning this list dies this entry in this list entry is lost as well. This does not lead to any problem as the PTL Processor will not find this transaction the TLOG at recovery time but identify it as result of a recover( ) call on the RM. As a result of our Presumed-Abort strategy the PTL Processor will decide to roll back the complete transaction.

In step 612 if XA_RMFAIL is true, processing proceeds to step 613, otherwise processing proceeds to step 614.

In step 613, for XA_RMFAIL the XA Specification says: "An error occurred that makes the resource manager unavailable." As this condition can be temporary the TM puts this transaction as a entry with intended decision to roll-back to the PTL. If the entry should get lost the next recover sequence will again report this branch so rollback can not be forgotten.

In step 614, if XA_RMERR is true, processing proceeds to step 615, otherwise processing proceeds to step 616.

In step 615 for XA_RMERR the XA Specification states: "An error occurred in rolling back the transaction branch. The resource manager is free to forget about the branch when returning this error so long as all accessing threads of control have been notified of the branch's state."

This situation is somehow exceptional and not very clever designed from the authors of the XA Specification. It happens only in a catastrophic situation in the RM. The TM doesn't know about the outcome of the transaction branch what can be treated as a heuristic hazard situation. What adds complexity here is the fact that additionally the RM tells the TM that he might forget about this transaction. This means that calling the recover method of the RM at a later time might not return this transaction anymore. Basically this means the RM breaks its promise to remember a transaction it has prepared.

An embodiment does not implement a special logic for this. If a RM forgets its transaction there's not much a TM can do about that. As it is unclear whether the RM has already forgotten we try to call forget on the RM if this is configured by the administrator. We return a SAPHeuristicHazardException.

In step 616, if the TM reaches this activity then something severe went wrong during transaction handling: It might be a failure in the RM, in the TM or in between. As well a human administrator might have interfered with transactional state. Here is a list of things which would be possible (quoted material taken from the DTP XA Specification):

"[XAER_NOTA] The specified XID is not known by the resource manager." This could be the case if an administrator decides to commit or rollback manually this pending transaction.

"[XAER_INVAL] Invalid arguments were specified." This points to an error within the RM or the RM XA driver.

"[XAER_PROTO] The routine was invoked in an improper context." This points to an error in the TM implementation.

"[XAER_ASYNC] TMASYNC was set in flags, and either the maximum number of outstanding asynchronous operations has been exceeded, or TMUSEASYNC is not set in the flags element of the resource manager's xa_switch_t structure." Java™ does not support the notion of asynchronous transactions so this points to an error in the RM or the RM XA driver.

If the return code is something else then it's a code not mentioned in the DTP XA Specification. This should never happen.

2.4 XA Resource Recreation

The PTL Processor within the application server has the task to recreate the XA Resource Managers at recovery time. All the information needed for this job will be stored in the transaction log according to an embodiment. This includes security credentials and other resource manager specific properties.

(An alternate embodiment looks into all deployed applications to find out about all involved XA RMs. Practically this is time consuming as scanning all applications would need reasonable CPU resources at PTL Processor startup.)

One implication of the non-alternate embodiment is that changes of RM security credentials or other properties will not have any impact on the PTL Processor. The PTL Processor will always try to complete a transaction with the same credentials and RM properties which were valid when the transaction was started.

The PTL Processor itself does not need to know how to recreate a RM. It may delegate this task to the RM Containers which implement a unique interface for such requests. There are currently three different flavors of RM types:

Generic Java Connector resources—particularly outbound resource adapters: The Connector Container (aka Connector Service) is responsible for the lifecycle of these RMs. This includes deployment and management of configuration data.

Data Sources: The Data Source Container (aka DBPool Service) is responsible for the System Data Source and for the deployment, configuration and the lifecycle of all custom data sources. Data Sources can be created via the JDBC (Java™ database connectivity) connector UI (user interface) or through deployment of a datasource.xml resource file. It is as well possible to deploy a Java Connector resource adapter which exposes a javax.sql.DataSource interface—but this kind of RM will be not be managed by the DBPool Service but the Connector Service. The DBPool service cares as well for the management of Data Source Aliases but these Aliases are just references to real Data Source objects. For other RM containers there is as well the same Alias concept.

JMS (Java™ messaging service) Queue/Topic Connection Factories. The JMS Container (aka JMS Connector Service) is responsible for the management of these resources. The configuration data of a JMS Factory is obtained from the JMS Connector Service and not from JMS Provider From a the standpoint of connection management the DBPool Service and JMS Connector Services are behaving like Java™ Connector Containers. But in practice they are strictly separated from the application server's Java™ Connector Container because the have a different deployment approach and a different configuration UI.

From the standpoint of the PTL Processor all RM containers are similar. They behave like XA Resource factories. As soon as a XA Resource Factory is started it registers itself with the TM. So the PTL Processor can query the TM and find out whether the needed XA Resource Factory is already available for serving XA Resource creation requests.

2.5 Orchestration of Transactional Subsystems

The transactional behavior of the application server is the result of the interaction of several transactional subsystems. All systems together orchestrate transaction handling and recovery.

2.5.1 Transaction Log—High Level View

The transaction log can either be located in the database or in the file-system. If file-system is chosen it is strongly recommended to us a shared one. Even if the file-system is not shared transaction recovery will work—but without the on-the-fly recovery capability. The next sections will explain that in more detail.

Each cluster node has one transaction manager. This transaction manager creates a new transaction log on each start. If the log is in the DBMS all log entries will share the same table, but it will be possible to differentiate the entries from the various starts and the various nodes.

In case of file-system each log will be a separate file. The TM is the owner of this TLOG and has exclusive access. In FIG. 3 this log is called TLog n (e.g., 320*a*).

2.5.2 Transaction Log—Compensating Entries

If the TM is running without any issues it is adding entries to the TLOG. Of course a typical transaction is only active for a very short of time—after that it can be deleted and no memory of it needs to be maintained.

These delete operations are not performed immediately but lazily according to an embodiment. Otherwise the write operations to the TLOG would double.

If a transaction is finished it is added to a Victim For Deletion List. There can be several of such lists in the TM: One for each TLOG.

The TM has a Victim For Deletion List for the TLOG it created at last startup. It adds transactions to this list as it finishes them.

The PTL processor can work on TLOGs from earlier startups. It maintains a Victim For Deletion List for each of these TLOGs.

The PTL Processor can as well work on transactions of the currently active TLOG if the TM submitted a problematic transaction into the PTL. So the PTL Processor adds as well entries to the Victim List of the active TLOG.

The Victim For Deletion List is an in-memory structure. If it reaches a certain size (for example 1000 entries) these 1000 entries will be deleted from the TLOG. This happens differently for DBMS and filesystem based TLOGs:

If the TLOG is DBMS based the records will be deleted with a single DELETE SQL statement.

If the TLOG is filesystem based there will be one or several compensating delete statements added to the TLOG. These entries use ranges, for example "delete transaction 501 to 1012". The only number to identify the transaction is the transaction serial number. The complete XID is not needed.

2.5.3 PTL Processor and PTL Processor Controller

The PTL Processor is responsible for bringing the pending transactions into a consistent state. If there are currently some RMs unavailable this task can take hours and needs ongoing retry attempts. So the PTL Processor runs in a thread of its own.

The PTL contains information about the XID, the overall intent of the record (should the transaction get rolled back or committed) and the status of each branch (was a branch already committed, rolled-back or is its status unknown).

If there is no work to do (empty PTL) the PTL Processor stops itself and the thread will be returned to the pool. The complete lifecycle of the PTL Processor is controlled by the PTL Processor Controller. This controller hosts the PTL and starts the PTL Processor if it is not running and there are entries in the PTL.

Basically there are two things the PTL Processor has to do: Care for pending transactions, and become the owner of an orphaned transaction log and recover the transactions within it.

Care for Pending Transactions

If a TM encounters a problem with a transaction it cannot handle immediately it adds the transaction to the PTL and returns an Exception to the calling application.

If the PTL Processor is successfully done with an entry in the PTL it removes it and puts this transaction to the Victim For Deletion List. Transaction entries in this list will be deleted from the TLOG lazily (see above). Successful completion of work could as well mean a transaction passed the transaction abandon timeout so that the PTL Processor finally gave up on it (maybe after one day of failing attempts).

Become the Owner of an Orphaned Transaction Log

The PTL processor loops continuously through the PTL from the first entry to the last one. If it starts again with the first one it checks whether the "Grab Transaction Log Flag" is set.

If yes and there are transaction logs from earlier starts the PTL processor will try to become responsible for them. If it succeeds and gets a TLOG it will read the TLOG in. Remember that a TM will never have any interest in any TLOG which is not the one it created at the last startup.

If the TLOG is file based, reading the log in may be done in a two phase approach: As already mentioned it might be that there are delete statements for transactions in the TLOG which compensate earlier entries. So the PTL processor reads first all entries of the TLOG in an in-memory staging area. This area will grow with each TLOG record and shrink again if a delete statement is found in the TLOG. If the PTL processor is done with reading each entry in the TLOG it will only have the last entries of the particular TLOG and maybe some more single transactions which were pending at the time of the last crash or shutdown.

Then, in a second phase, all entries of this staging area become processed and some of them which cannot get resolved immediately will be transferred to the PTL.

If the log is DBMS based no staging area is needed. The DBMS log gets treated like the staging are in the filesystem case. So processing of the staging are or the DBMS based TLOG will be done in the following way:

First the PTL Processor (PP) will reads the RM entries which belong to this TLOG and call recover on them.

If this the PP is successfully done with a RM it stores the result in a in-memory Recover Result List. If one RM is not available it stores a NULL entry for this RM in the Recover Result List. A NULL entry is not an empty list. An empty list means the RM is available and has no pending transaction.

After this initial sequence of recover calls the PP processes the entries in the staging area one by one. It reconstructs the XID of an entry and all Ids of the RMs which were involved in the this transaction.

This XID will be compared against all XIDs in the Recover Result Lists.

There are several possible outcomes:

The XID of the TLOG entry is not present in the any of the Recover Result Lists. This means there is no pending transaction in any of the RMs. So the transaction can simply be forgotten. It gets added to the Victim For Deletion List for this TLOG.

The RM entry of one of the involved RMs is null meaning the RM is currently not accessible. So at this time it cannot be decided whether the specific transaction is still pending in this currently unavailable RM. So it gets added to the PTL.

The XID is in some or all of the involved RMs' Recover Result list. So the PTL processor will try to resolve this XID on these pending RMs. If that is successful the transactions is done and gets added to the Victims For Deletion List. If not it gets added to the PTL.

If there are XIDs in the Recover Result List which belong to this TLOG but are not part of this TLOG it rolls the branches in these RMs back (this is the Presumed-Abort strategy).

It must taken care that the PTL processor tries to call recover on RMs which are currently unavailable even if there are no entries anymore in the PTL for this RM. Still there could be transactions which need to be rolled back on this currently unavailable RM.

The PTL processor has to track whether a TLOG is completely finished an can get deleted. So it does maintain a counter for each TLOG indicating how many transactions are in the PTL from a specific TLOG. If this counter reaches zero it deletes the associated TLOG from the filesystem or the relevant DBMS table.

2.5.4 Singleton Pattern in the PTL Processing: Competition for TLOGs

The PTL Processor knows the locations of all transaction logs, including the ones from other TMs on other machines. In case of file system based logs this location is a simply shared folder. If the "Grab Transaction Log Flag" in the PTL Processor Controller becomes set to true the PTL Processor tries to grab all available transaction logs. In doing this it is competing against PTL Processors sitting on other nodes. Each transaction log has only one owner. This implements a singleton pattern in the cluster which can be commonly found in the context of transactional recovery.

In FIG. 3 one can see a PTL Processor on node m which grabbed a TLOG which was produced by the TM sitting on node m+1. There is no disadvantage if a PTL Processor is taking care for an orphaned TLOG which was produced by a TM from another node. So an embodiment does not implement any TM to PTL Processor affinity logic.

As a PTL processor only checks the state of its "Grab Transaction Log" flag when it starts again with the first entry in the PTL there is at least some load balancing between cluster nodes.

In summary, setting the "Grab Transaction Log Flag" to true means to initiate recovery. But who is responsible for setting this flag?

The PP Controller subscribes to the Cluster Node Loss event. In case a node is lost the flag becomes switched on. This triggers all PTL Processors on all nodes to grab the orphaned logs. Problematic here is that a normal shutdown triggers this event as well—so the PP Controller must assure that shutdown is not initiated on the local node before setting the flag to true.

In case one does not want to rely on the Cluster Node Loss event it would be possible to additionally use java.util.timer to set the flag to true in predefined time configurable intervals.

As outlined the PTL Processors are competing for TLOGs. How is it guaranteed that a single TLOG can never have two owners?

In case of file-system based logs synchronization is easy: The PTL Processor calls the tryLock method on the according FileChannel. If it gets the lock others fail. If the node crashes the operating system removes the lock from the file.

If the TLOG lives within the DBMS there will be a TLOG table. For each logical TLOG there is one record in the table. This record contains an owner and a time-lease column. If a PP owns a TLOG it makes an lease entry in this table specifying itself as the owner and supplying the time in GMT until which it owns the TLOG. If it wants to keep the TLOG it has to renew this entry before the lease time is over. If another PP discovers an outdated TLOG owner entry it considers his owner as dead. Problematic here is that this lease based approach introduces a latency.

A TM is the owner of a TLOG and reserves it for a configurable amount of 10 (e.g. 10 minutes).

The TM crashes, the Node Loss Events get fired.

A PP on another node scans the log and sees this log is still reserved. So normally it would not try to become responsible for it although currently there is no owner anymore caring for the TLOG. This delays the on the fly recovery.

One solution according to an embodiment is that the PP controller knows the Id of the node which crashed. So if a crashed node is the owner of a TLOG the lease might not be valid anymore. One drawback to this embodiment is that the crashed node could have been started already again so the TLOG is in reality a fresh one or one the PP of the crashed node is already caring for.

2.5.5 Node Startup

To illustrate the orchestration of transactional components here a sequence of what gets performed during cluster startup:

First the TM on a node starts. It creates a fresh new transaction log and uses it exclusively.

After that the "Grab TL" flag will be set to true. This will start the PTL Processor on this node.

The PTL Processor opens the first orphaned transaction log it can get. It reads in all the RMs which were used in this log. This is simple because the RM information is not mixed into the normal TLOG but available as an extra entity (in practice as a separate file or a separate table).

The PTL Processor creates a list of XAResource factories which are needed to recreate the RMs. E.g. there might be five data sources and three JCA (J2EE connector architecture) adapters, so the outcome would be that one JDBC XAResource factory and one JCA XAResource factory is needed.

During that time the server starts as well the XAResource factories belonging to the server infrastructure independently. If a XAResource factory is ready to receive requests it registers itself with the TM. So the TM knows all available XAResource factories.

The PTL Processor checks with the TM whether all needed XAResource factories are already started. If not it waits for some time and retries. Even if not all RMs are coming up it is possible to recover already some transactions (described later in this document).

The PTL Processor recreates all involved RMs using the XA Resource factories.

The PTL Processor calls recover on all RMs and stores the result in-memory.

The PTL Processor reads in each entry in the TLOG, compares against the recover-results and populates the PTL.

The PTL Processor tries to open the next TLOG and repeats the last steps above.

As one can see each node startup initiates a recovery sequence. Because of this there will be transactional recovery even if the TLOG is sitting on top of a non-shared file-system. The recovery will be not on the fly but during the next start-up of the crashed node.

Of course on-the-fly recovery is recommended as it happens nearly instantly. The quicker recovery happens the lesser is the probability for heuristic decisions of the RMs.

2.6 Transaction Timeouts 2.6.1 XA Transaction Timeout Before Prepare

There are different possibilities to define a transaction timeout using JTA. One of them is to call the setTransactionTimeout method on the current javax.transaction.UserTransaction instance before calling begin on the same instance.

In case of a distributed transaction this timeout is the time span during which the transaction must reach the prepare state. If the timeout is not defined programmatically a system wide default can be taken. It should be possible to define additionally a time-out on resource manager level which overrides the system default. So the case of an exceptionally slow RM can be modeled.

The TM propagates this timeout to the involved RMs by calling XAResource.setTransactionTimeout( ) before calling XAResource.start (only in case there is any timeout defined).

2.6.2 XA Transaction Abandon Time

If a transaction reaches the prepare state it must be completed within the XA transaction abandon time span. This timeout is configured as a system wide setting—a typical default value is 20 hours. If a TM is not able to bring a transaction within this time into a consistent state it will give up on the particular transaction and log it with a heuristic outcome (most likely the transaction status will be HEURHAZ).

3. XID Structure and Transaction Log Version 3.1 Introduction

The XID is the identifier the TM hands out to the RMs to mark the transaction branches. The RM performs its recoverable piece of work under this XID. If a system crashes the TM will ask the RM at a later time about its pending transactions. The RM will return the XIDs—so the TM has to be able to recognize whether it is was the originator of this XID and is subsequently responsible for the recovery of this transaction.

The XA Specification gives the implementers of TMs some freedom about the length and content of the different parts of the XID. The parts are Format ID, Global Transaction ID, and Branch Qualifier.

3.2 Unique identification of a Transaction Log

The PTL Processor takes responsibility for recovering transactions which are belonging to a set of transaction logs. These transaction logs might be from previous starts of a TM. But as well the currently generated transaction log defines a certain set of transactions for which the PTL Processor has to take care. How is the Processor now able to decide whether a transaction pending in a RM belongs to set of TLOGs it is responsible for? The answer is simple:

First it checks whether the Format ID is "SAP1". If yes it knows it was a SAP NW (NetWeaver) JS (Javascript) TM which created the transaction.

Then it compares whether the TLOG version coded into the XID is equal to one of the TLOG versions it is currently responsible for. The TLOG Version is consists of the following parts: System ID, Node ID, and TM Startup Time. System ID identifies the system. Node ID identifies a node within a cluster uniquely. The Instance ID is already mixed into this ID and does not need to be added separately. TM Startup Time is the startup date/time of the TM in GMT. The granularity is milliseconds. Two startups of a TM within one millisecond is regarded as impossible. Alternate embodiments may adjust these parameters.

3.3 XID Structure

The different parts of the XID structure include Format ID, Extended Global Transaction ID, and Branch Qualifier. The Format ID is "SAP1" (according to an embodiment). The "1" may be replaced with versioning information in alternative embodiments. The Branch Qualifier identifies the RM uniquely within the TLOG.

The Extended Global Transaction ID includes a Global Transaction ID and a Branch Iterator. The Branch Iterator may be used in rare circumstances if Java™ EE res-sharing-scope is set to unshareable.

The Global Transaction ID includes TLOG version, Transaction Sequence number, Transaction Birth Time, Transaction Abandon Time, and TX Name Identifier. The TLOG version identifies the transaction log instance. The Transaction Sequence number identifies the transaction uniquely within the TLOG. The Transaction Birth Time is the date and Time in GMT the transaction was created by the TM. The Transaction Abandon Time is the date and time at which the transaction will be abandoned. The TX Name Identifier is a unique identifier of the transaction name which was used.

Basically two kinds of attributes can be differentiated: Attributes which are needed for the proper functioning of the transactional systems and attributes which are piggy-packed and give additional information about a specific transaction. Remember that because of the presumed abort strategy sometimes the XID is the only information a TM has during recovery of a transaction. This is the case when the TM decided to roll back the transaction so there is no TLOG entry but a RM returned an XID as result of a recover call.

Here a description of the purpose of the different attributes:

3.3.1 Transaction Sequence Number

This number identifies uniquely the transaction within the TLOG. If the TLOG is DBMS based the sequence number will be a index column. The number starts at zero if a TM starts up and increases without stopping. If there would be 10,000 transactions per second the length of 8 bytes are enough to support several million years of uptime. Gaps between numbers are allowed.

3.3.2 Transaction Birth Time

This attribute is informational only. The time in GMT gets set if the TM creates a transaction. Can be useful for database administrators to find out the reason why the transaction has problems because it gives them a hint which part of their log they should browse to identify the root cause of the problem.

3.3.3 Transaction Abandon Time

Format is GMT—this attribute gets set if the transaction is created. If a PTL Processor later finds this time it knows when it can abandon the transaction. This is the case even if some or all involved RMs are nor reachable. If the current time is after the abandon time the PTL Processor is free to abandon the transaction and to erase all memory it is has about it.

3.3.4 Transaction Name Identifier

Storing complete transaction names in the GTRID would blow up the XID. Instead of that only a 4 byte integer value gets stored which points to an entry in the transaction name table.

3.3.5 Branch Iterator

Some Java EE specifications allow to define a resource reference. This includes the definition of a res-sharing-scope element. It specifies whether connections obtained through the given resource manager connection factory reference can be shared. The value of this element, if specified, must be one of the two following: Shareable or Unshareable. The default value is Shareable. Here an example from an EJB Deployment descriptor:

```
<resource-ref>
  <res-ref-name>jdbc/CustomerDBMS</res-ref-name>
  <res-type>javax.sql.DataSource</res-type>
  <res-auth>Container</res-auth>
  <res-sharing-scope>Unshareable</res-sharing-scope>
</resource-ref>
```

Setting this attribute to Unshareable is nearly under all circumstances a bad idea. It means that connection sharing is not allowed and an application ends up with several physical connections to the same RM. A practical example:

A transaction is started by the TM with XID tx4711.

The application gets a new connection to a RM. For this connection there is always a XA Resource instance associated. Let's call this Instance XAResource1. The TM associates the connection with XID 4711:

XAResource1.start(tx4711);

Now the application creates a second connection to the same RM. Let's call the XA resource associated with this connection XAResource2. Normally the TM would issue the following code:

XAResource2.start(tx4711);

Sadly this will not work as XAResource1 and XAResource2 are pointing to the same RM. The RM will complain that there is already a TM which started a transaction with this Global Transaction ID. This complaint is valid as the RM cannot know that the TM behind these two connections is the same. The RM must assume there are two TMs accessing it and maybe one will request at a later point of time to commit the transaction and the other one will request to rollback the transaction. So it cannot allow two physical connections being infected with the same XID.

One possibility to overcome this is to use different Global Transaction IDs on these connections. Exactly this purpose serves the 1 Byte long Branch Iterator. The first connection gets a Branch Iterator of 0 and the next connection to the same RM gets an Branch Iterator incremented by 1. And so on. This limits the number of connections within a single transaction to a single RM to 256, beyond that an exception will be thrown.

For the RM the two transactions are not related at all to each other. So there is 2PC semantics even within a single RM if resource sharing is set to unshareable.

For the TM it is still a single transaction and there is only one record in the TLOG if the TM decides to commit.

3.3.6 Extended Global Transaction Id

The Global Transaction ID is the representation of a transaction within the application server, e.g. the TM and the PP. This ID as well identifies a transaction within the TLOG.

The external RMs do not see this Global Transaction Id but a combination of the Global Transaction Id and the Branch Iterator. Both attributes together form the Extended Global Transaction Id.

4. Transaction Log Structure

4.1 Entities of the Transaction Log

The transaction log stores different entities which are needed to achieve transactional recovery. These entities include the TLOG Entity, the TLOG Entry Entity, the Transaction Name Entity, the RM Entity, and In-Memory Entities.

4.1.1 TLOG Entity

The TLOG entity has one instance (translates to one record in the DBMS case) for each logical transaction log. The owner of the TLOG is able to reserve the complete log by updating this instance and supplying its identification in the owner attribute and a GMT time in the leasedUntil attribute until the reservation is valid. After that time the TLOG is considered to be available to anybody.

The owner is a combination of the role of the owner (TM or PP) and the Cluster Node Id.

In the file-system case this entity might not be necessary. The filename can serve as version identifier and locking is controlled by the OS.

4.1.2 TLOG Entry Entity

The TM is generating a global Transaction ID which identifies the transaction. Every RM which participates in this transaction is a branch and gets a branch Id assigned by the TM. This branch Id stays the same for the complete lifetime of the TM, this means from startup of the TM until shutdown. If a transaction uses a new RM which was not known to the TM before the TM adds this RM to the RM entity. Generation of the branchId could be done by simply increasing an TM internal counter.

The reason why the branch IDs are stored in the TLOG Entry is the following:

Consider there's a transaction tx1 including RM a, b, c.

The PTL Processor knows that for the complete log the RMs a, b, c, d are involved.

So at the start of the recovery sequence the PTL Processor calls recover on RM a, b, c, d. But RM d is currently unavailable due to a transient or permanent failure.

Despite of the unavailability of RM d the PTL Processor can recover tx1 as it knows for sure RM d was not involved.

If the TLOG is file based a checksum should be added to the end of ach entry, e.g. java.util.zip.CRC32. So it's clear we have a valid record or the fragment of a dying TM.

4.1.3 Transaction Name Entity

The SAP TM allows additionally to specify a human readable transaction name. This can be helpful in case the Recovery Service later needs to report problems to the administrator. Instead of reporting "Xid 4711 had a heuristic outcome" a message could be "Transaction 'OrderBooking' has a heuristic outcome". The transaction name should never be specific to a transaction instance like "order #12345", it is more a transaction classifier.

Another advantage of transaction names is that monitoring can become more meaningful. Transaction throughput and failures can get drilled down according to the transaction name.

The TM writes to the Transaction Name entity before it does the first prepare call on any RM. In the TLOG itself only a short transactionNameId gets stored which is part of the Global Transaction ID. If the application is not using transaction names then no record will be written.

There is one risk with transaction names: If an application uses transaction instance specific names then the TM ends up with one write operation to this entity for each transaction additionally to updating the TLOG. This will double the number of write operations. As well the transaction name table would grow indefinitely.

So there may be according to an embodiment a configurable restriction on the maximum number of transaction names, e.g., 1000. After that number new transaction names will be ignored. Alternatively a LRU (least recently used) strategy for the internal transaction name cache can be implemented. As there is no apparent advantage in allowing a high number of transaction names this might be an overkill.

4.1.4 RM Entity

As already mentioned the TM creates a persistent entity of all RMs which were used by the TM during its lifetime. This information must be sufficient to recreate the XA Resource Managers at recovery time. This implies that the XAResourceFactoryId gets stored, pointing to the Resource Factory which is able to create an XAResource of this type. The factory gets as well the name, properties and credentials to perform the recreation task. If the TLOG is file-system based the RM Entity becomes a file of it's own. As it stores credentials it will be encrypted.

The RM entity will be read in by the PTL Processor before the TLOG Entries get digested. A recover call will be done on all RMs within the RM entity and after that the TLOG entries will be processed to populate the PTL.

4.1.5 In-Memory Entities, Transaction Representation in the RM, and Entity Lifecycle Additionally to the persistent entities there is an in-memory representation of the transaction and a representation of the transaction in the RMs. The following sequence explains how the different entities become populated:

First the TM creates a Global Transaction Id.

The application can optionally assign a transaction name to the transaction. It should do so before the first RM gets touched.

The TM checks whether the transaction name is already known by comparing it to an internal transaction name cache. If yes it takes the position in the cache as the transaction name identifier. If no it adds the transaction name to the internal cache, assigns a transaction name identifier and writes the transaction name to the transaction name entity. (This step can be delayed until the first xa_start( ) is happening.)

4.2 Transaction Log Lifecycle

Each distributed transaction gets added to the transaction log. If a transaction is completed it is not necessary to keep a memory anymore so the particular transactions can become victims for deletion. To reduce the write operations to the disk/DBMS this deletion should happen lazily. This lazy approach can lead to the effect that there are transactions in the log which are already completed. The whole PTL Processor is designed in a way that this is not generating problems: At recovery time the PTL Processor will discover the completed transaction in the log and find that none of the RMs returned an fitting Xid. So it will assume this transaction as not to be of any interest anymore.

4.2.1 DBMS Based Transaction Log

The TM has an in-memory data structure which keeps track of completed transactions. After a predefined number of entries (e.g. 100) the TM will perform a single delete operation against the TLOG Entry table in the way of:

DELETE FROM TLOG_ENTRIES WHERE XID IN (Xid1, Xid2, . . . , Xid100)

The PTL Processor will do deletion of entries in a similar way. If it is done with populating the PTL it knows all the Xids which are in the TLOG but no longer active. It will issue a similar SQL delete operation like shown above.

If the TM encounters a normal shutdown sequence and there are no active transactions anymore it is free to additionally delete the record in the TLOG table which represents the complete transaction log.

If the recovery service has no pending transaction anymore for a certain transaction log it deletes additionally the complete transaction log by deleting the record in the TLOG table which represents this transaction log.

4.2.2 File-System Based Transaction Log

If the TLOG is based on a file-system the overflow in a new file has to be taken care of. As the TM knows all active and pending transactions the following overflow procedure happens if the file reaches a predefined configurable number of entries (e.g. 1000):

A new transaction log file gets created.

A new RM log file gets created.

All active and pending transactions get copied to the new log file.

All RMs which are used by these active and pending transactions become copied to the new RM log.

All internal data structures pointing to the old files will be updated so they point to the new files.

The old files (TLOG and RM log) get deleted.

The Recovery Service does not delete any individual entries. But it checks if it is done with the last pending entry belonging to a certain transaction log. If so it deletes the TLOG and RM log where the last pending entry belonged to. As there is a transaction abandon timeout which will typically around one day the complete transaction log cannot survive longer than a day after the last entry became added.

5. Interposed Transaction Manager

In most usage scenarios an application server is under full control of its transactions. An remarkable exception to this is caused by the Java Connector Architecture, starting with release 1.5. In this specification it is defined that a resource adapter can propagate an imported transaction to an application server, so that the application server and subsequent participants can do work as part of the imported transaction.

This contract allows a resource adapter to flow-in transaction completion and crash recovery calls initiated by an Enterprise Information System (EIS).

So summarized the application server acts as a normal RM to the external transaction manager. To achieve this the application server hosts an Interposed TM: It offers a RM like interface to the external TM and coordinates the internal RMs like a normal TM.

The XID of the income transaction will be mapped on an internal Xid issued by the interposed TM. The mapping between these two has to be persisted at the latest at prepare-time.

5.1 Transaction Timeouts of the Interposed Transaction Manager

5.1.1 RM Transaction Abandon Time

The JCA Specification allows a JCA Adapter to do several in-bound requests as part of the same transaction. For each request the adapter is able to set a transaction timeout as part of the request. It achieves this by creating an ExecutionContext and calling the setTransactionTimeout method on it. The ExecutionContext will be submitted together with the Work instance which the adapter created to the application server's Work Manager.

The interposed TM will only use the transaction timeout of the first request which initiated the transaction. It will interpret this time as the time span which is allowed for the complete transaction including follow-up requests. Based on this time-out and the current system time the interposed TM will calculate the absolute time in GMT after which the TM is free to abandon the transaction.

In case of a distributed transaction which reached already the prepare-state abandoning a transaction translates into making a heuristic decision—so the impact of this time-out is rather dramatic.

If the JCA adapter does not define a time-out a default time-out will be taken. This should be defined either system wide or in the deployment descriptor of the adapter.

5.1.2 RM Transaction Timeout Before Prepare

A transaction branch can already timeout before it reaches prepare. Rolling back a transaction branch before prepare should never lead to a heuristic outcome of the complete transaction. So typically it is expected that the transaction timeout before prepare is shorter than the transaction abandon timeout. As the Java Connector specification does not define such a timeout a SAP proprietary timeout is set according to an embodiment. Such a definition may be a system wide setting or a adapter specific one.

5.2 Transaction Log of the Interposed Transaction Manager

The interposed TM will have a separate transaction log which includes the following information:

Incoming Xid of the external TM.

Internal Xid of the application server TM which is mapped to the external Xid. Only this Xid is used when dealing with internal RMs.

Transaction abandon time in GMT.

Identification of RMs which are enlisted in the transaction including their votes.

Outcome of complete transaction in case it has been heuristically completed (HEURRB, HEURCOM, HEURMIX, HEURHAZ).

After the transaction abandon time has elapsed the interposed TM will try to roll back the transaction heuristically. The outcome of this operation will be stored in the transaction log so it can be reported the next time the external TM tries to continue with the transaction or calls recover on the interposed TM. The interposed TM will keep the entry about the heuristically completed transaction until the external RM calls forget on it.

5.3 The Interposed Transaction Manager within the Cluster

As many Java™ EE specifications the Java™ Connector Architecture doesn't deal with fail-over and load distribution in a clustered environment. Depending on the logic of the application and the content of the message the Enterprise Information System (EIS) sends to the application two cases can be differentiated:

A message needs to get processed on all cluster nodes. An example for that could be a stock quote message which updates a cluster node internal representation of a stock's market price.

A message may only be received by a single node within a cluster. An example could be a "new customer" events which receives a request to create a new customer record in a DBMS.

Both cases are supported according to an embodiment. The Connector specification mandates Message Driven beans as consumers of the messages coming from the EIS. So the way to switch on parallel delivery of messages is to set "topic-on-all-nodes" to true in the DD [data description] of the MDB [message driven bean] (the term topic for this setting might be misleading because it points to JMS but results from historical decisions).

Another issue is whether an EIS recognizes incoming connections from the EIS specific adapters on the different cluster nodes as the same logical EIS adapter. As a side mark here the connection request is always originating from the adapter and not the EIS. The behavior depends only from the EIS and the specific adapter. Again two cases can be differentiated:

The EIS assumes that all incoming connections are logically identical. This can be compared to a situation where maybe Peter (the adapter) calls Thomas (the EIS) using his mobile phone. The connection gets disconnected because the accumulator of the mobile phone runs empty so Peter calls again—this time using his office phone. Thomas is able to continue to talk to Peter because Peter identified himself as being the same Peter like before.

The EIS assumes that all incoming connections are different. In the example given above Thomas will insist that the Peter calling him and using his office phone is a different Peter because the incoming caller id showed on Thomas' phone is different.

FIGS. 7A-7D illustrate four uses cases according to an embodiment of the present invention.

Figure 7A:
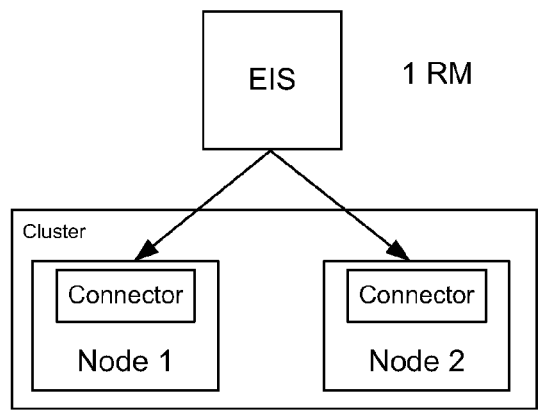
FIGS. 7A-7D illustrate four uses cases according to an embodiment of the present invention.

In FIG. 7A topic-on-all-nodes is set to true and the EIS is talking to both nodes assuming they are logically one. It is possible that the EIS sends a message to one node, prepares the transaction on another and finally commits elsewhere.

To support this behavior a cluster wide transaction registry is needed which could be a severe bottleneck. So the decision was taken to not support this scenario according to an embodiment of the present invention.

Figure 7B:
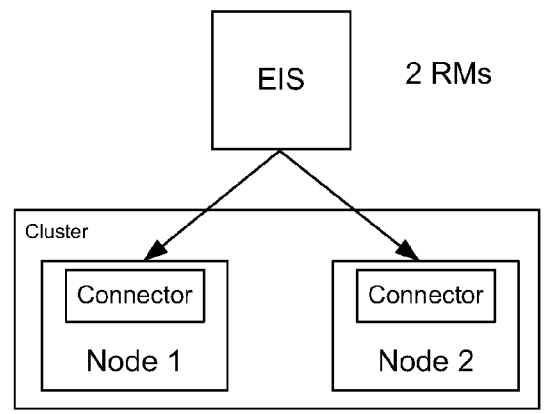

In FIG. 7B the difference to FIG. 7A is that the EIS thinks the nodes are different. As a result of this transactions will be strictly local to the node. If one node crashes it is impossible for the EIS to call recover until the node is up again. This scenario is supported according to an embodiment.

Figure 7C:
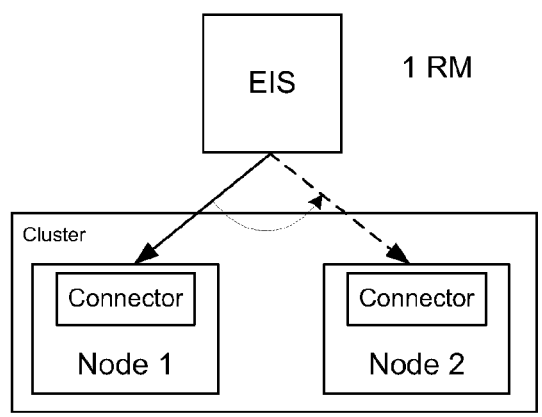

In FIG. 7C topic-on-all nodes is set to false. If node 1 crashes the message processing will be automatically shifted to node 2 based on the fail-over support of the application server. It is important to mention that there will be no automatic fail-back. Even if node 1 is up again it will not consume any longer messages coming from the EIS. An embodiment supports this scenario but with some side effects: If a transaction was started but not ended before the fail-over the following rules apply:

If the transaction was still before prepare-state it will be rolled back automatically by the involved back-end RMs. Otherwise a shared transaction registry would be needed.

If the transaction is after prepare than there will be an entry in the transaction log of the interposed TM. Node2 will receive commit/rollback/recover request for the transaction started on node1. To allow this the transaction log of the interposed TM has to be shared.

Figure 7D:
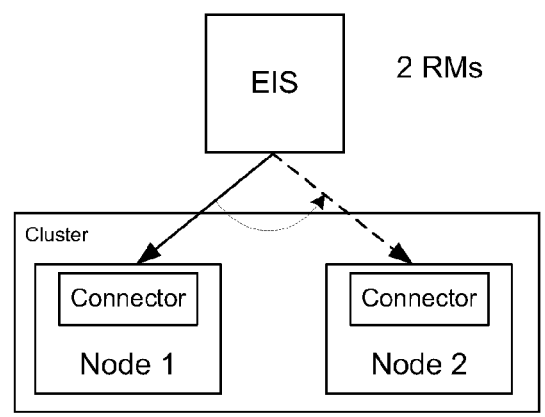

In FIG. 7D topic-on-all nodes is set to false. After crash of node 1 the adapter in node 2 will establish a connection to the EIS. The EIS will not recognize the adapter on node 2 as being related to the crashed adapter. So the EIS will not try to continue any transaction which was started before fail-over time. Although an embodiment implements this scenario, it may be documented as unsupported as it leads to heuristic transaction outcomes.

6. Transaction Log Write Accelerator

Two Phase Commit transaction processing is quite heavy compared to non XA style processing because of its physical I/O. Most of that is due to the fact that there are several disk forces needed within a single transaction. As an example consider a transaction where there are two RDBMS involved—all writing to the same disk:

- At prepare both RMs have to disk force—1 for each RM—2 in total.
- If the TM decides to commit it writes to the TLOG—another disk force.
- Both RMs commit—another 2 disk forces.
- Later the TLOG entry gets cleaned up—but this will be done without forcing again.

So in total one ends up with five disk forces instead of a single one if local transactions are used. The amount of time needed for a disk force can be expected as between 5 to 50 milliseconds, depending on the disk available. If transaction payload is small the disk synching can become the dominant part in the transaction handling so it needs to be fast.

An embodiment increases throughput by grouping updates to the TLOG together and performing that as part of a single operation to the file system or DBMS. Practically this means that a group of application threads accessing the TM get delayed until the sync is done because they are all grouped together in a single sync operation.

- Below a critical throughput, it makes no sense to group updates to the TLOG together. Each update to the log is performed by the application thread itself. So the number of updates to the TLOG per sync operation is one.
- Above a critical throughput, I/O becomes the bottleneck. There are more application threads wanting to add to the TLOG than the disk or DBMS can handle. This introduces a severe limitation on the maximum throughput the system can achieve.

To overcome this issue the updates of the different application threads are grouped together and performed as a single sync operation against the TLOG. If transactional throughput of the TM increases, more and more updates to the TLOG are grouped together.

The TM implementation subsequently supports two modes according to an embodiment:

- Low throughput mode: TLOG updates within the application thread.
- TLOG batch mode: TLOG updates are done in a separate thread.

One of the challenges here is to decide when it is an advantage to switch to TLOG batch mode—in other words, how to define the critical throughput number. This number depends on the hardware. An embodiment implements a self adapting mechanism which finds out this magic number by trying:

- In TLOG Batch mode each application thread appends its TLOG update to an buffer.
- A separate thread is taking the content of the buffer and writes it to the TLOG. If the thread is done with writing it will find already the buffer filled by many application threads which added to it. It will again take the buffer and release the waiting application threads. And so on.
- If the thread comes back and sees that there is no or only one entry in the buffer waiting it knows it is not really needed. There are no requests to group. It will increase an EmptyCycle counter by one.
- If the thread finds a buffer filled with more than one entry it will increase the NonEmptyCycle by one and set the EmptyCycle counter back to zero.
- If the EmptyCycle Counter exceeds a predefined maximum number of empty cycles (e.g., 100) the thread switches to low throughput mode and deactivates itself. This is the exit criteria for the TLOG Batch subsystem. The reason why the Batch subsystem deactivates itself not immediately is to implement a hysteresis behavior. If a transactional system is around the critical throughput it will not oscillate between TLOG batch and low throughput mode constantly but only if there is a longer time span with low transactional demand.

After it is now clear when the TM will switch the TLOG Batch mode off the question is when to switch it on. For this the NonEmptyCycle counter may be used: If the NonEmptyCycle counter is small it means the TLOG Batch subsystem had not really a lot to do. With other words it was senseless to switch it on from the very beginning.

On the other hand the TM knows the current transactional throughput. This is achieved by counting the total amount of transactions and dividing them with the time they took (e.g., all 100 transactions or all 10 seconds the throughput gets calculated).

So if NonEmptyCycle is low the conclusion can be drawn that below the current transaction rate it makes no sense to switch batch mode on. This defines a new guess for the critical throughput number. If the current transaction rate is above the critical throughput number then the TM switches again TLOG batch mode on. After some iterations the critical throughput value will reach the rate fitting to the current hardware equipment.

Figure 8:
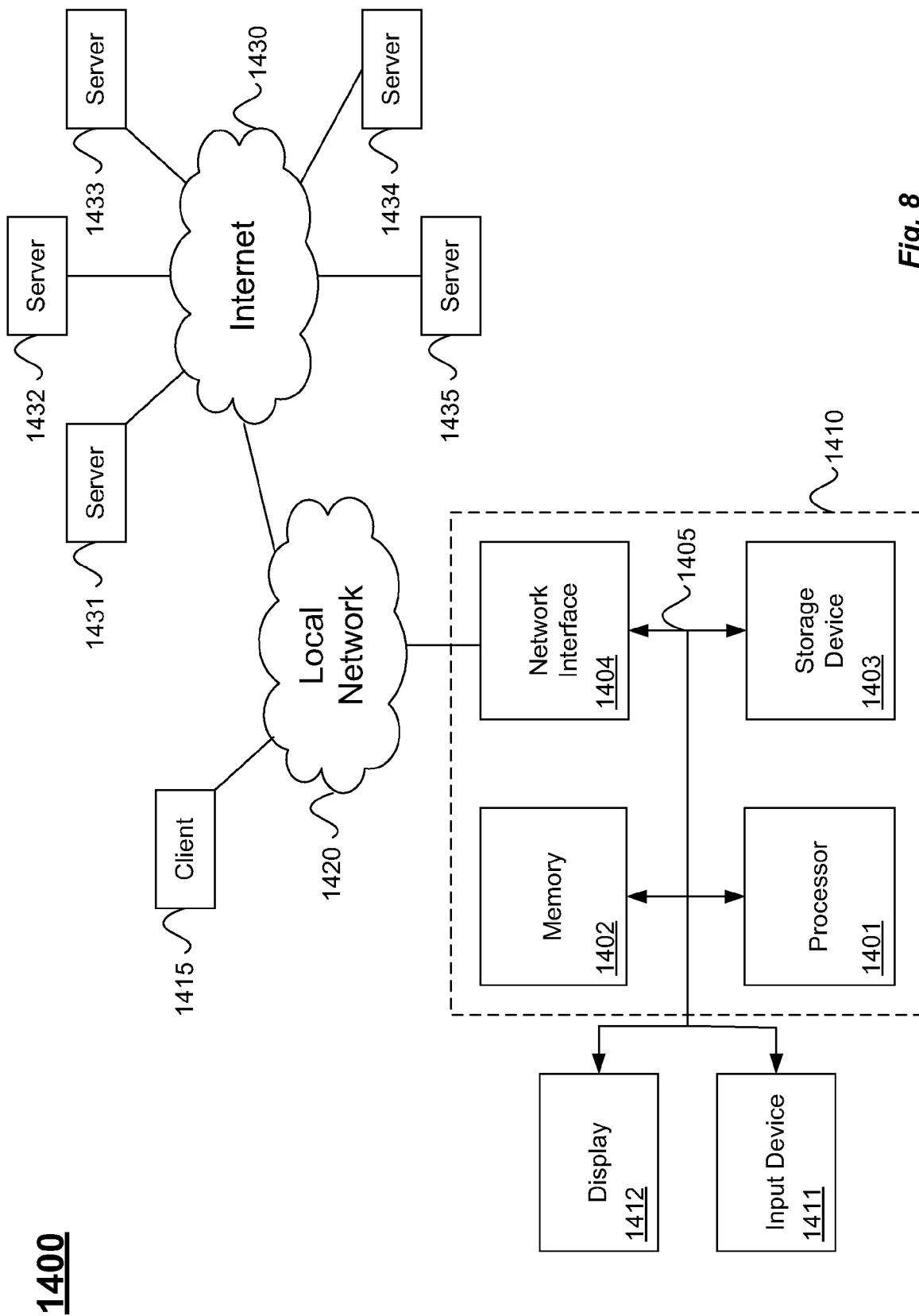
FIG. 8 is a block diagram of an example computer system and network for implementing embodiments of the present invention.

FIG. 8 is a block diagram of an example computer system and network 1400 for implementing embodiments of the present invention. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. A server 1431 may transmit actions or messages from one component, through Internet 1430, local network 1420, and network interface 1404 to a component on computer system 1410.

The computer system and network 1400 may be configured in a client server manner. The client 1415 may include components similar to those of the computer system 1410.

More specifically, the computer system 1410 may implement an application server (e.g., 114d in FIG. 2).

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A system for transaction recovery in a distributed computing environment, comprising:
   a transaction log server that stores a shared transaction log having a plurality of portions including a first portion, a second portion and a third portion;
   a plurality of application servers that implements a distributed transaction application and that accesses the shared transaction log when performing a transaction using the distributed transaction application, wherein the plurality of application servers includes a first application server, a second application server and a third application server, wherein the first application server accesses the first portion, the second application server accesses the second portion, and the third application server accesses the third portion; and
   a plurality of resource servers that stores data and that operates with the plurality of application servers to access the data according to the transaction,
   wherein the plurality of application servers, the plurality of resource servers, and the transaction log server are implemented by a plurality of hardware devices that are connected via a network,
   wherein an inconsistency appears in the data stored by the plurality of resource servers when the first application server becomes a failed application server,
   wherein the second application server and the third application server compete for responsibility of the first portion when the first application server becomes the failed application server,
   wherein, as a result of competing, one of the second application server and the third application server assumes responsibility for the first portion to rollback the inconsistency in the data,
   wherein when the first application server becomes a failed application server, the transaction log server sets a flag in each of the second application server and the third application server,
   wherein the flag in each of the second application server and the third application server controls the second application server and the third application server competing for responsibility of the first portion,
   wherein the second application server and the third application server each have a pending transaction list, wherein the second application server and the third application server each loop through their respective pending transaction list, and wherein the second application server and the third application server compete according to a result of each looping through their respective pending transaction list, and
   wherein the second application server of the plurality of application servers comprises a pending transaction list processor that accesses the second portion of the shared transaction log corresponding to the second application server, and that accesses the first portion of the shared transaction log that was previously accessed by the failed application server.

2. The system of claim 1, wherein the transaction log server includes one of a file system and a database management system.

3. The system of claim 1, wherein an application server of the plurality of application servers comprises:
   a transaction manager that executes the transaction; and
   a pending transaction list processor that accesses the shared transaction log.

4. The system of claim 1, wherein the shared transaction log includes a plurality of logical transaction logs, wherein each of the plurality of logical transaction logs are associated with a corresponding one of the plurality of application servers and a corresponding run identifier.

5. The system of claim 1, wherein an application server of the plurality of application servers comprises:
   a pending transaction list that stores a plurality of pending transactions;
   a pending transaction list processor that accesses the shared transaction log and the pending transaction list.

6. The system of claim 1, wherein an application server of the plurality of application servers comprises:
   a victim for deletion list that stores entries to be deleted from the shared transaction log; and
   a transaction manager that adds a completed transaction from the shared transaction log to the victim for deletion list when the transaction manager has completed the completed transaction, and that deletes the entries in the victim for deletion list from the shared transaction log when the victim for deletion list reaches a defined size.

7. The system of claim 1, wherein an application server of the plurality of application servers comprises:
   a transaction manager that performs a group update to the shared transaction log.

8. A computer-implemented method of transaction recovery in a distributed computing environment, comprising:
   storing, with a transaction log server, a shared transaction log having a plurality of portions including a first portion, a second portion and a third portion;
   implementing, with a plurality of application servers, a distributed transaction application that accesses the shared transaction log when performing a transaction using the distributed transaction application, wherein the plurality of application servers includes a first application server, a second application server and a third application server, wherein the first application server accesses the first portion, the second application server accesses the second portion, and the third application server accesses the third portion; and storing, with a plurality of resource servers, data, wherein the plurality of resource servers operates with the plurality of application servers to access the data according to the transaction, wherein the plurality of application servers, the plurality of resource servers, and the transaction log server are implemented by a plurality of hardware devices that are connected via a network, wherein an inconsistency appears in the data stored by the plurality of resource servers when the first application server becomes a failed application server, wherein the second application server and the third application server compete for responsibility of the first portion when the first application server becomes the failed application server, wherein, as a result of competing, one of the second application server and the third application server assumes responsibility for the first portion to rollback the inconsistency in the data, wherein when the first application server becomes a failed application server, the transaction log server sets a flag in each of the second application server and the third application server, wherein the flag in each of the second application server and the third application server controls the second application server and the third application server competing for responsibility of the first portion, wherein the second application server and the third application server each have a pending transaction list, wherein the second application server and the third application server each loop through their respective pending transaction list, and wherein the second application server and the third application server compete according to a result of each looping through their respective pending transaction list, and wherein the second application server of the plurality of application servers comprises a pending transaction list processor that accesses the second portion of the shared transaction log corresponding to the second application server, and that accesses the first portion of the shared transaction log that was previously accessed by the failed application server.

9. The computer-implemented method of claim 8, wherein an application server of the plurality of application servers comprises:
    a pending transaction list that stores a plurality of pending transactions;
    a pending transaction list processor that accesses the shared transaction log and the pending transaction list.

10. The computer-implemented method of claim 8, wherein an application server of the plurality of application servers comprises:
    a victim for deletion list that stores entries to be deleted from the shared transaction log; and
    a transaction manager that adds a completed transaction from the shared transaction log to the victim for deletion list when the transaction manager has completed the completed transaction, and that deletes the entries in the victim for deletion list from the shared transaction log when the victim for deletion list reaches a defined size.

11. The computer-implemented method of claim 8, wherein an application server of the plurality of application servers comprises:
    a transaction manager that performs a group update to the shared transaction log.

12. A computer program embodied on a plurality of non-transitory storage media, comprising:
    a shared transaction log, stored by a transaction log server, wherein the shared transaction log includes a plurality of portions having a first portion, a second portion and a third portion;
    a distributed transaction application, stored by a plurality of application servers, that accesses the shared transaction log when performing a transaction, wherein the plurality of application servers includes a first application server, a second application server and a third application server, wherein the first application server accesses the first portion, the second application server accesses the second portion, and the third application server accesses the third portion; and
    data, stored by a plurality of resource servers, that is accessed by the distributed transaction application according to the transaction,
    wherein the plurality of application servers, the plurality of resource servers, and the transaction log server are implemented by a plurality of hardware devices that are connected via a network,
    wherein an inconsistency appears in the data stored by the plurality of resource servers when the first application server becomes a failed application server,
    wherein the second application server and the third application server compete for responsibility of the first portion when the first application server becomes the failed application server,
    wherein, as a result of competing, one of the second application server and the third application server assumes responsibility for the first portion to rollback the inconsistency in the data,
    wherein when the first application server becomes a failed application server, the transaction log server sets a flag in each of the second application server and the third application server,
    wherein the flag in each of the second application server and the third application server controls the second application server and the third application server competing for responsibility of the first portion,
    wherein the second application server and the third application server each have a pending transaction list, wherein the second application server and the third application server each loop through their respective pending transaction list, and wherein the second application server and the third application server compete according to a result of each looping through their respective pending transaction list, and
    wherein the second application server of the plurality of application servers comprises a pending transaction list processor that accesses the second portion of the shared transaction log corresponding to the second application server, and that accesses the first portion of the shared transaction log that was previously accessed by the failed application server.

13. The computer program of claim 12, wherein an application server of the plurality of application servers comprises:
    a pending transaction list that stores a plurality of pending transactions;
    a pending transaction list processor that accesses the shared transaction log and the pending transaction list.

14. The computer program of claim 12, wherein an application server of the plurality of application servers comprises:

a victim for deletion list that stores entries to be deleted from the shared transaction log; and a transaction manager that adds a completed transaction from the shared transaction log to the victim for deletion list when the transaction manager has completed the completed transaction, and that deletes the entries in the victim for deletion list from the shared transaction log when the victim for deletion list reaches a defined size.

15. The computer program of claim 12, wherein an application server of the plurality of application servers comprises:
a transaction manager that performs a group update to the shared transaction log.

16. The system of claim 1, wherein the inconsistency resulting from failure violates ACID criteria (atomicity, consistency, isolation and durability).

17. The system of claim 1, wherein the inconsistency resulting from failure corresponds to a corruption of the data stored by the plurality of resource servers.

18. The computer-implemented method of claim 8, wherein the shared transaction log includes a plurality of logical transaction logs, wherein each of the plurality of logical transaction logs are associated with a corresponding one of the plurality of application servers and a corresponding run identifier.

19. The computer program of claim 12, wherein the shared transaction log includes a plurality of logical transaction logs, wherein each of the plurality of logical transaction logs are associated with a corresponding one of the plurality of application servers and a corresponding run identifier.

* * * * *